(12) United States Patent
Konduru et al.

(10) Patent No.: US 12,339,127 B2
(45) Date of Patent: Jun. 24, 2025

(54) AUTONOMOUS VEHICLE DELIVERY INGESTION AND ROUTING

(71) Applicant: Uber Technologies, Inc., San Francisco, CA (US)

(72) Inventors: Kartheeka Srinivas Varma Konduru, Seattle, WA (US); Shu yang Li, Santa Clara, CA (US); Sejal Kiran Shinde, San Jose, CA (US); Zelin Liu, Bellevue, WA (US); Andrew Theodore Irish, Oakland, CA (US)

(73) Assignee: Uber Technologies, Inc., San Francisco, CA (US)

( * ) Notice: Subject to any disclaimer, the term of this patent is extended or adjusted under 35 U.S.C. 154(b) by 92 days.

(21) Appl. No.: 18/479,786

(22) Filed: Oct. 2, 2023

(65) Prior Publication Data
US 2025/0109948 A1 Apr. 3, 2025

(51) Int. Cl.
*G01C 21/34* (2006.01)
*B60W 60/00* (2020.01)

(52) U.S. Cl.
CPC ... *G01C 21/3415* (2013.01); *B60W 60/00256* (2020.02); *B60W 2556/50* (2020.02)

(58) Field of Classification Search
CPC ............ G01C 21/3415; G01C 21/3438; G01C 21/3605; B60W 60/00256; B60W 2556/50
USPC ........................................................ 701/411
See application file for complete search history.

(56) References Cited

U.S. PATENT DOCUMENTS

| 9,921,070 | B1 * | 3/2018 | Nimchuk | G01C 21/3679 |
|---|---|---|---|---|
| 12,033,194 | B2 * | 7/2024 | Fujimoto | G01C 21/3438 |
| 2019/0019146 | A1 * | 1/2019 | Chraibi | G08G 1/202 |
| 2022/0343248 | A1 * | 10/2022 | Niklaus | G08G 1/202 |
| 2023/0325760 | A1 * | 10/2023 | Miello | G06Q 10/08355 |
| | | | | 705/338 |

FOREIGN PATENT DOCUMENTS

| EP | 3658857 B1 * | 9/2023 | G01C 21/3415 |
|---|---|---|---|
| WO | WO-2023183385 A2 * | 9/2023 | G01C 21/3407 |

OTHER PUBLICATIONS

N. Floudas et al., "Public transport optimisation based on traveller requests and network efficiency," 2014, Publisher: IET.*

* cited by examiner

*Primary Examiner* — Tuan C To
(74) *Attorney, Agent, or Firm* — Schwegman Lundberg & Woessner, P.A.

(57) ABSTRACT

Various examples are directed to systems and methods for generating improved autonomous vehicle (AV) navigation route data and estimated time of arrival (ETA) data. A system may receive delivery data from an AV delivering a passenger or product, where the delivery data includes a delivery origin, a delivery destination, and an ETA and navigation route generated by the AV. The AV may have accurate short-term information, such as the next few navigation maneuvers planned by the AV. The system may be able to provide more accurate longer-term information, such as generating an overall calculated route and calculated completion time based a current location and the delivery destination. The system may receive updated short-term information and combine this information with the calculated route and calculated completion to generate a more accurate set of route data and ETA data.

20 Claims, 14 Drawing Sheets

AUTONOMOUS VEHICLE DELIVERY INGESTION AND ROUTING

BACKGROUND

An autonomous vehicle (AV) is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates vehicle's controls based on the resulting information.

When navigating a route, an AV may have accurate short-term routing information. This short-term routing information may be based on a view of surrounding traffic and a planned upcoming navigation maneuver. However, this short-term routing information may be different from an overall route between an origin and a destination planned by a vehicle navigation service. A vehicle management system that receives the short-term information may calculate and display the overall route as a combination of the short-term routing information and a haversine line (e.g., direct line) between the end of the short-term route and the overall destination, however this haversine line may pass through buildings and other obstacles that an AV cannot traverse. Additionally, navigation routes generated for a human driver are often different from a route taken by an AV. These differences in routes often result in generating incorrect route lines and incorrect ETA information for AV passengers, for delivery recipients, and for any route that includes multiple waypoints or subsequent ride requests.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
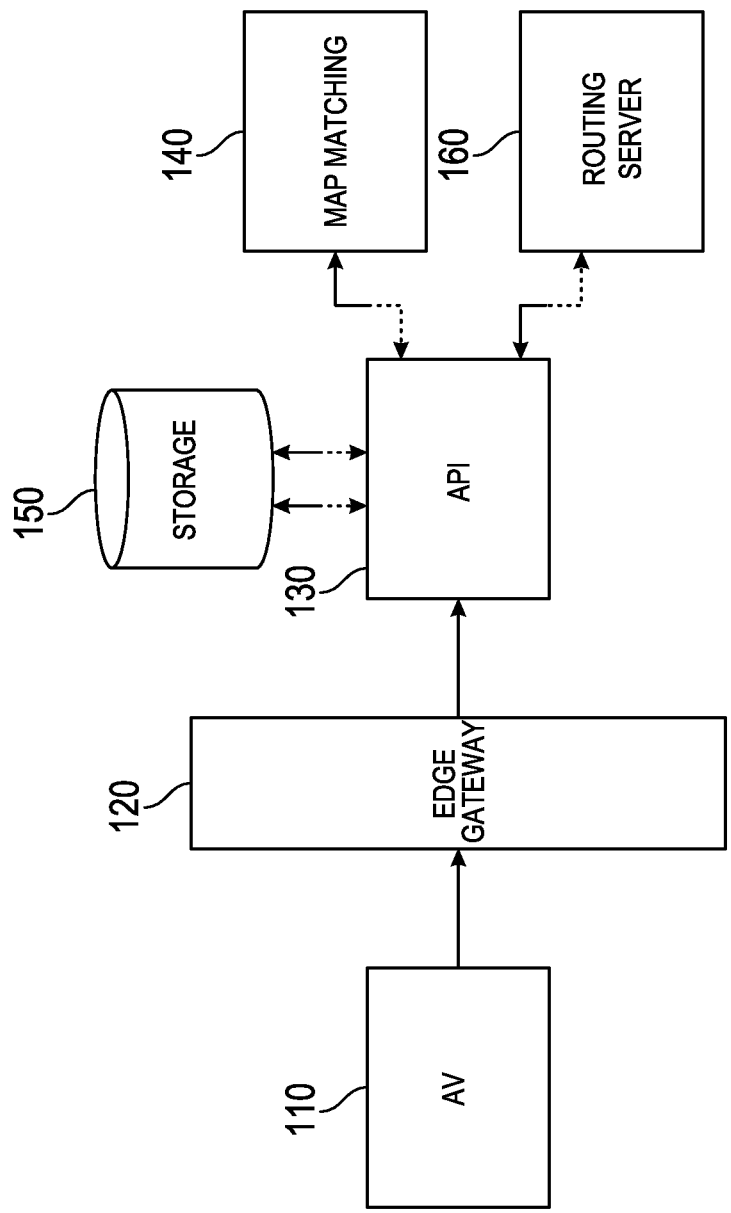
FIG. 1 is a diagram showing an example AV routing architecture.

Examples described herein are directed to systems and methods for using a computing system to generate improved AV navigation route data and estimated time of arrival (ETA) data. A route taken by an AV may be determined by the AV, and may be based on real-time information captured by AV sensors about the environment surrounding the AV. AVs typically do not compute a full route from origin to destination. In some examples, calculating the full route from origin to destination may be infeasible, such as due to the limited sensor range of the AV or due to the increased complexity of the high-fidelity maps used by AV. Because the route taken by the AV is based on the AV environment, the route will likely be different from a route determined based only on the origin and destination. Instead of calculating a full route, the route lines for an AV may provide a path between a current location and a waypoint (e.g., an intermediate anchor point) between origin and destination, and the next segment of route is planned after the AV arrives at the waypoint. For an AV navigating a route with multiple waypoints throughout the route, the actual route taken by the AV will likely be different from a series of route segments determined based on the waypoint information.

To display the full route and ETA on an AV display or on a user's electronic device, the partial route may be combined with additional routing information to generate a composite route and ETA between the origin and destination. In an example, the short-term route information generated at the AV may be combined with a route determined based on a current location and the next waypoint or destination. The resulting calculated composite route and ETA may be displayed to an EV passenger on a display within the EV, or may be sent to a delivery recipient for display using smartphone application or other computing device. The route and ETA may be recalculated throughout the route, such as in response to the AV being rerouted or in response to a timer expiration.

The improved AV navigation route data and ETA data described herein may be used by the vehicle or a delivery request user to improve the accuracy of the reported route and ETA displayed within a vehicle or to the delivery request user. These improved AV navigation route data and ETA data also provides technical improvements, such as improved operation of each AV, improved operation of a fleet of AVs, or improved operation of a fleet management server or AV delivery service server. These technical improvements may include improving AV fleet efficiency and cost savings by improved vehicle routing, reducing idle time, reducing labor costs associated with human drivers. These improvements may also include improving the ability of a fleet management server to scale or deploy a fleet, and include improving the ability of an AV delivery service server to request AV services from one or more AV service providers to anticipate and meet changes in demand. These improvements may also provide improved AV delivery customer experience through improved reliability of delivery times and improved real-time tracking.

FIG. 1 is a diagram showing an example AV routing architecture 100. The AV routing architecture 100 may be used to generate improved AV navigation route data and ETA data for an AV 110. Initially, the AV 110 or a computing system associated with the AV (e.g., AV fleet management server) may send delivery data to an edge gateway 120 or other computing system, where the delivery data may include ETA and route information. The edge gateway 120 may send a request message with the delivery data to a server, such as an API server 130. The API server 130 may exchange map data with a map-matching service 140, which may match the route line to an AV basemap and return the mapping information. Because the maps displayed to AV passengers or delivery recipients are based on the AV basemap, the matching of the route line to the AV basemap enables generating a basemap that can be displayed accurately on an AV display or in a smartphone app of the delivery recipient. This avoids a mismatch between the route and the basemap, such as a route that cannot be displayed correctly on a basemap road (e.g., cannot be snapped to the basemap road) or a displayed route that goes through a basemap obstacle (e.g., a building, a river crossing without a bridge). The map matching may include correcting raw GPS location data based on AV basemaps, adjusting map-agnostic geometries (e.g., route line segments from the AV) to the AV basemap, or path matching a third-party route to the AV basemap. Following the map matching, the API server 130 may then store the matched route line and calculated ETA in storage 150.

A routing server 160 may be used to generate or retrieve the route line and calculated ETA. In an example, the routing server 160 may be accessed by a computing device within the AV or a computing device of a user requesting a delivery. When a current route and ETA is requested, the routing server 160 may send an update request through API server 130. The API server 130 may then fetch the route line and calculated ETA from the storage 150 and return the data to the routing server 160. While AV routing architecture 100 describes various components as implemented on a server, similar functionality may be implemented on other physical or logical computing devices, such as virtual servers, cloud computing services (infrastructure as a service (IaaS), platform as a service (PaaS), software as a service (Saas)), or other physical or logical server devices.

Figure 2:
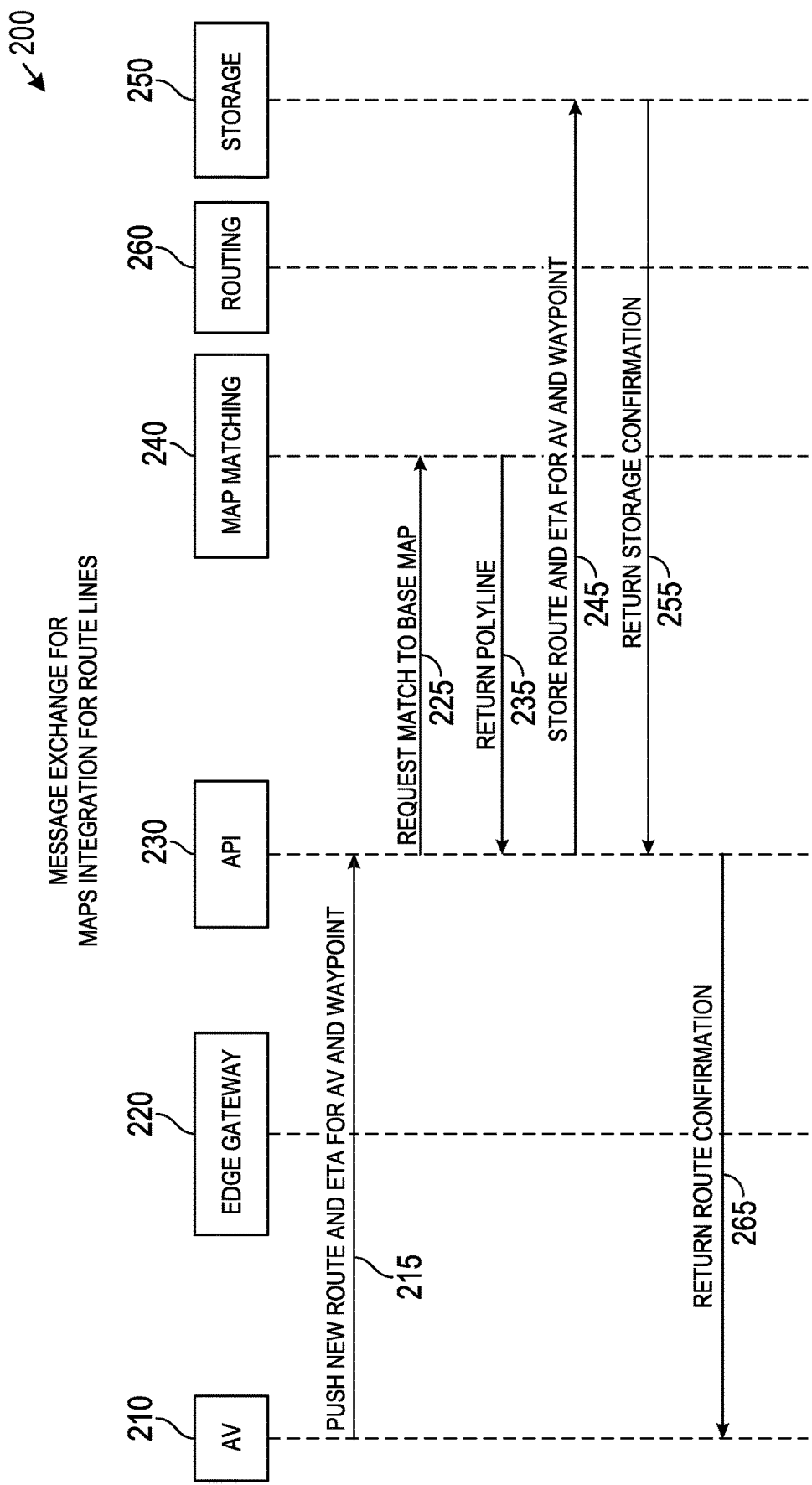
FIG. 2 is a diagram showing an example AV routing message exchange.

FIG. 2 is a diagram showing an example AV routing message exchange 200. The AV routing message exchange 200 shows an example message communication flow for generating improved AV navigation route data and ETA data, such as may be used in AV routing architecture 100. This AV routing message exchange 200 may be in response to the AV provider or AV 210 accepting a delivery request or reaching a waypoint and beginning navigation to a subsequent waypoint. This AV routing message exchange 200 may also be initiated whenever the AV or AV provider generates a new ETA for a current route or generates a new route and corresponding ETA, such as when there is a change in the route or when there is a change in the ETA calculation.

The AV routing message exchange 200 may begin with an AV 210 sending 215 delivery data to an edge gateway 220 to an edge gateway 220. In response to receiving the delivery data, the edge gateway 220 may forward the delivery data to an API 230. The delivery data may include ETA and route information for an AV 210 and upcoming waypoint (e.g., delivery destination). The API 230 may then forward the delivery data to a map-matching server 240 with a request 225 to match the request to the basemap.

The map-matching server 240 may generate and return 235 a route and ETA (e.g., a set of updated delivery data) based on the delivery data and the basemap. The route may include a sequence of connected route waypoints (e.g., polyline route, polygonal waypoint chain). The API 230 may store 245 the route and ETA in storage server 250, and the storage server 250 may return a storage confirmation 255. The route and ETA may be stored and accessed separately. In an example, because ETA may be updated more often than the route, the separation of storage of the route and ETA may reduce communication bandwidth and computation requirements. In response to receiving the storage confirmation 255, the API 230 may submit a route storage confirmation 265. The routing server 260 may be used to generate a route, such as shown and described in FIG. 3.

Figure 3:
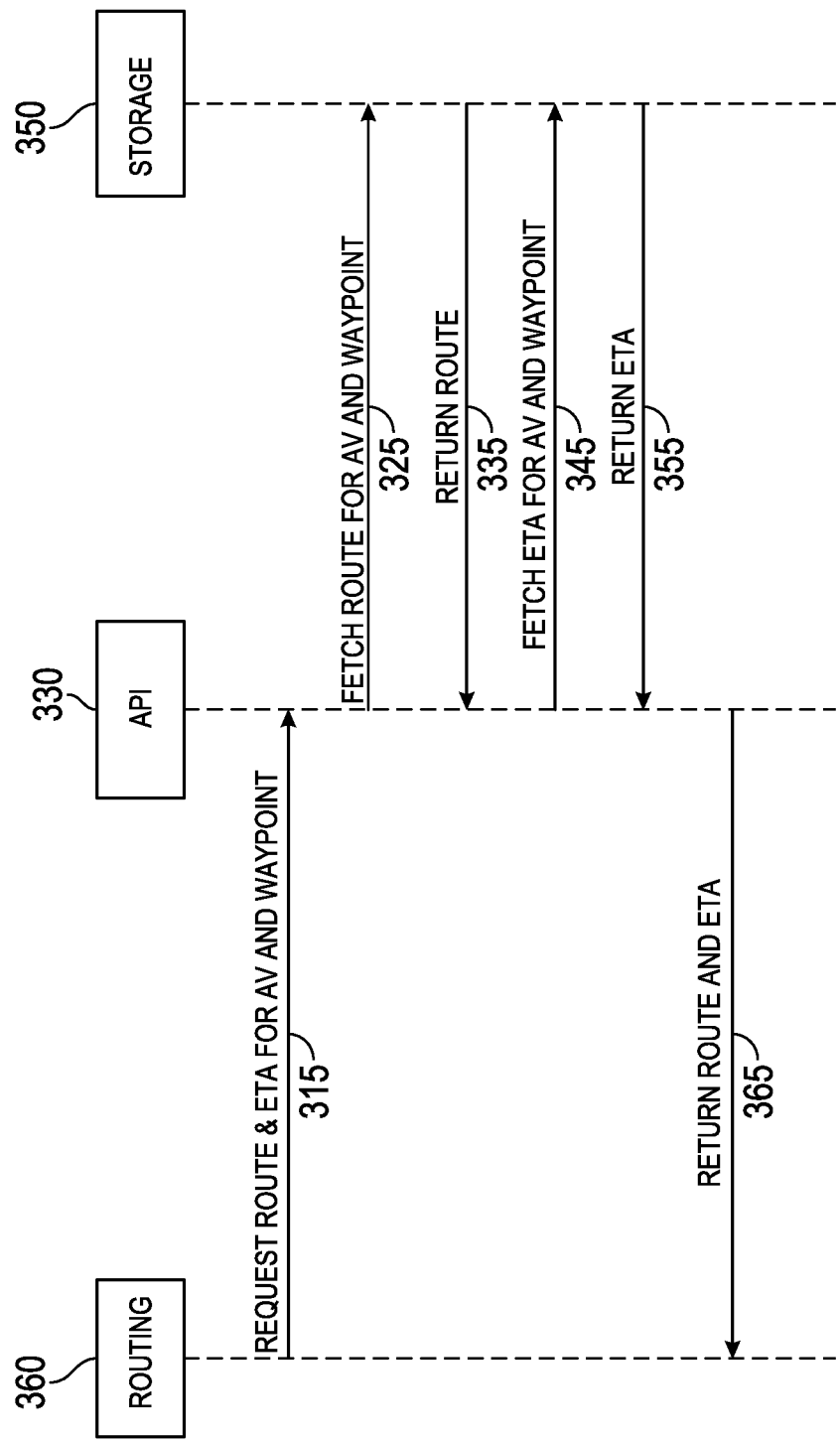
FIG. 3 is a diagram showing an example AV updated routing request message exchange.

FIG. 3 is a diagram showing an example AV updated routing request message exchange 300. A routing server 360 may submit a request 315 for a route and ETA for a given AV and waypoint to an API 330. This request 315 may be in response to a user requesting an updated ETA and route, such as the user opening or refreshing a delivery application on a smartphone. This request 315 may also be sent during AV navigation, such as in response to a rerouting event, in response to the expiration of a periodic timer (e.g., every two minutes), or in response to a waypoint completion.

In response to receiving the request 315, the API 330 may initiate a route fetch command 325 to a storage server 350 for the route for a given AV and waypoint. In response to receiving the route fetch command 325, the storage server 350 may return routing data 335. In response to receiving the request 315, the API 330 may initiate an ETA fetch command 345 to the storage server 350 for the ETA for the AV and waypoint, and the storage server 350 may return ETA data 355. The API 330 may then combine this data and return the composite route and ETA 365 to the routing server 360.

Figure 4:
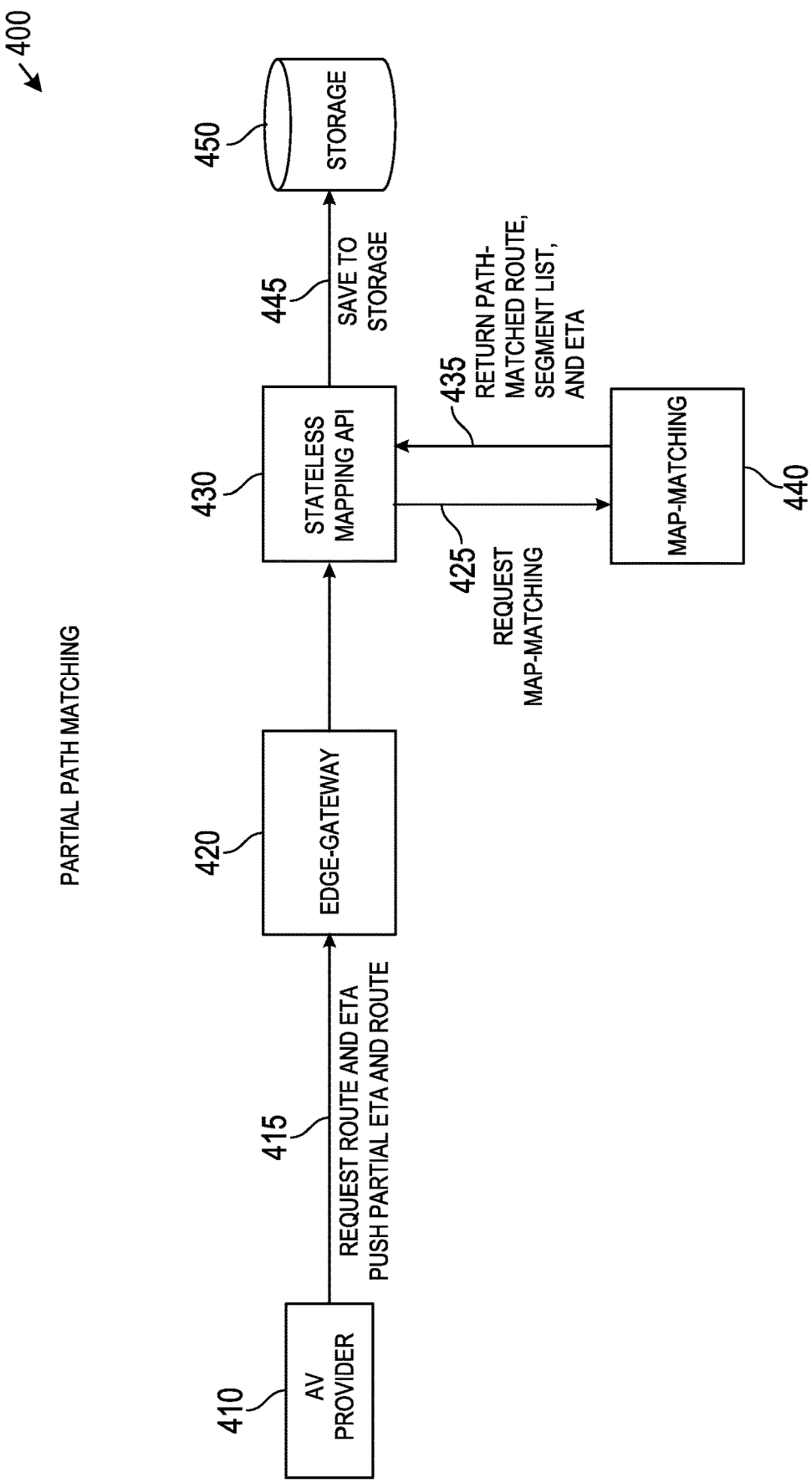
FIG. 4 is a diagram showing an example data flow for partial path matching.

FIG. 4 is a diagram showing an example data flow for partial path matching 400. The partial path matching 400 (e.g., route line combining, route line stitching) may be used when a partial path and ETA for the partial path are provided by an AV. The partial path matching 400 may be used to ensure the AV partial path may be connected smoothly to any subsequent portion of the route between an origin and destination.

The partial path matching 400 may begin with an AV provider 410 (e.g., individual AV, AV fleet management service) sending a request 415 for a route and ETA through an edge gateway 420 to a stateless mapping API 430. The request 415 may include sending a partial ETA and partial route. The stateless mapping API 430 may send the partial ETA and route and a map-matching request 425 to a map-matching server 440. The map-matching server 440 may connect the AV partial path to a subsequent portion of the route between the end of the partial path and the AV destination. In an example, the map-matching server 440 may decompose one or more routes between the origin and destination into route segments, match the end of the AV partial path (e.g., AV partial path waypoint) with the beginning of a route segment, generate a second route portion between the beginning of the route segment and the destination, and combine the AV partial path and the second route portion.

The map-matching server 440 may then return 435 the path-matched route, segment list, and ETA to the stateless mapping API 430. The stateless mapping API 430 may then save 445 the generated route and ETA data to a storage device 450. The route and ETA may be stored and accessed separately, such as to allow separate updating or retrieval of the ETA.

Figure 5:
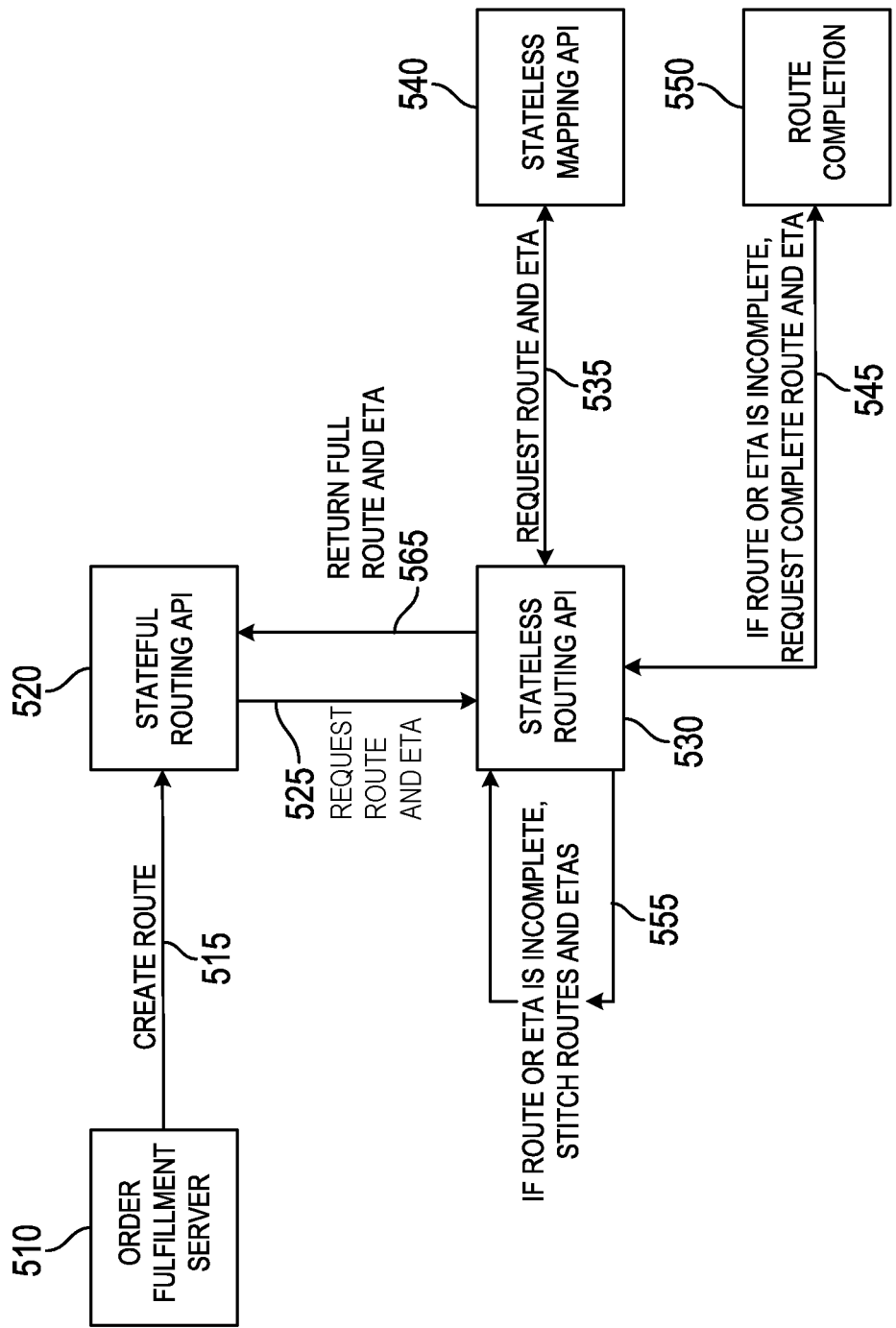
FIG. 5 is a diagram showing an example data flow for route and ETA injection.

FIG. 5 is a diagram showing an example data flow for route and ETA injection 500. The route and ETA injection 500 may be requested at the time an AV delivery or other AV navigation task is requested, and may be used to generate an updated route and ETA.

The route and ETA injection 500 may begin when a user submits an AV request through an order fulfillment server 510. The order fulfillment server 510 then submits a route creation request 515 to a stateful routing API 520. In an example, the stateful routing API 520 may be used to store and access the current state of a route, the AV progression (e.g., location) along the route, and an ETA based on the AV progression.

In response to receiving the route creation request 515, the stateful routing API 520 may submit a route and ETA request 525 to a stateless routing API 530. In response to receiving the route and ETA request 525, the stateless routing API 530 may submit a route and ETA request 535 to a stateless mapping API 540, and the stateless mapping API 540 may generate and return the route and ETA.

If the returned route or ETA is incomplete, the stateless routing API 530 may forward the incomplete data and submit a completion request 545 to a route completion server 550. In response to the completion request 545, the route completion server 550 may return a subsequent portion of the route or ETA between the end of the incomplete route and the AV destination. In response to receiving the subsequent portion of the route or ETA provided in response to the completion request 545, the stateless routing API 530 may stich routes and ETAs 555 (e.g., sum the individual ETA times) into a completed route and ETA.

Once the route and ETA have been received, either in response to the route and ETA request 535 or following combining (e.g., stitching) routes and ETAs 555, the route and ETA may be returned 565 to the stateful routing API 520. The stateful routing API 520 may store the route and ETA, and may allow the AV or a user to request a current ETA and current state of the AV progression along the route.

Figure 6:
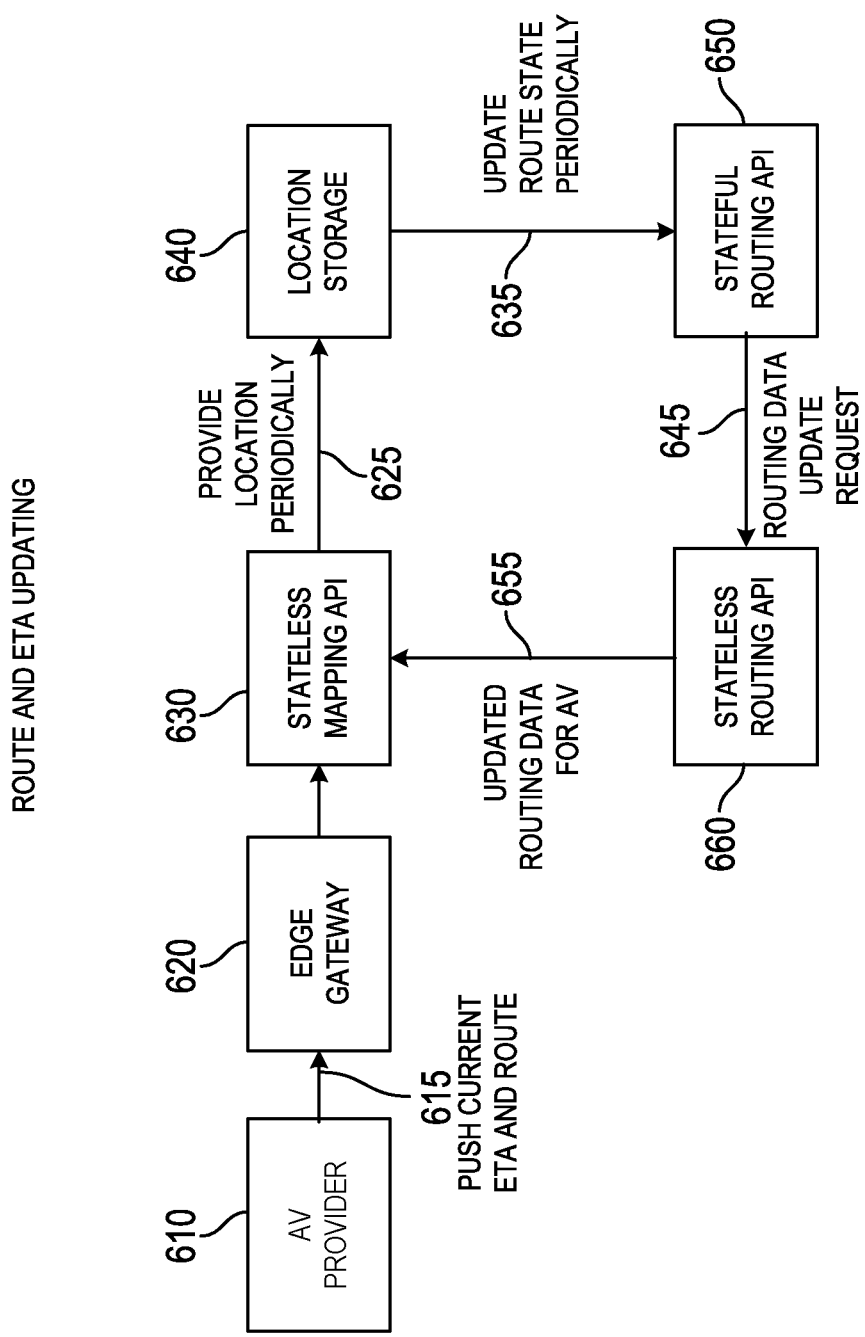
FIG. 6 is a diagram showing an example data flow for route and ETA updates.

FIG. 6 is a diagram showing an example data flow for route and ETA updates 600. These route and ETA updates 600 may be requested by an AV that is in the process of following a previously determined route (e.g., without reroutes). The route and ETA updates 600 may include an AV periodically providing its current route and requesting an updated route and ETA, such as route and ETA updated based on real-time traffic information.

The route and ETA updates 600 may begin when an AV provider 610 submits a current route and ETA 615 through an edge gateway 620 to a stateless mapping API 630. The stateless mapping API 630 provides a periodic AV location update 625 to a location storage server 640. In an example, the periodic AV location update 625 may be provided every five seconds, every minute, or another periodic interval.

The location storage server 640 provides a periodic route state update 635 to a stateful routing API 650. The periodic route state update 635 may be provided at a longer interval the periodic AV location update 625, which may be used to ensure that the periodic route state update 635 is generated based on a recently received periodic AV location update 625. In an example, the periodic AV location update 625 may be provided every five seconds, and the periodic route state update 635 may be provided every six to ten seconds.

The stateful routing API 650 may periodically send a request to update routing data 645 to the stateless routing API 660. In an example, the routing data 645 may include a request to update the route and ETA for a given AV. In another example, the routing data 645 may include a current AV route and may include a request to update only the ETA based on the current AV route and other available information (e.g., real-time traffic information). Because the ETA is continually changing, updating the ETA without recomputing the route may reduce computational resources and bandwidth. In response to receiving the request to update the routing data 645, the stateless routing API 660 may generate a revised routing data 655 for a given AV. The revised routing data 655 may include an updated route and ETA or may include only an updated ETA. The stateless routing API 660 may send that revised routing data 655 to the stateless mapping API 630. This sequence of route and ETA updates 600 may be used to improve or maximize the likelihood that the route and ETA available at the stateless routing API 660 is up to date.

The stateful routing API 650 may send the request to update routing data 645 to the stateless routing API 660 in response to various triggering events. In a first example, the request to update routing data 645 may be sent when the latest vehicle location is too far from an existing route. In this example, the stateful routing API 650 may detect a rerouting event and send the request to update routing data 645. In a second example, the stateful routing API 650 may periodically call the stateless routing API 660 for ETA and route updates, such as every thirty seconds, every minute, or another periodic interval. In a third example, when a waypoint is completed, stateful routing API 650 may send the request to update routing data 645 for one or more of the subsequent waypoints. The waypoint example is described further with respect to FIG. 7.

Figure 7:
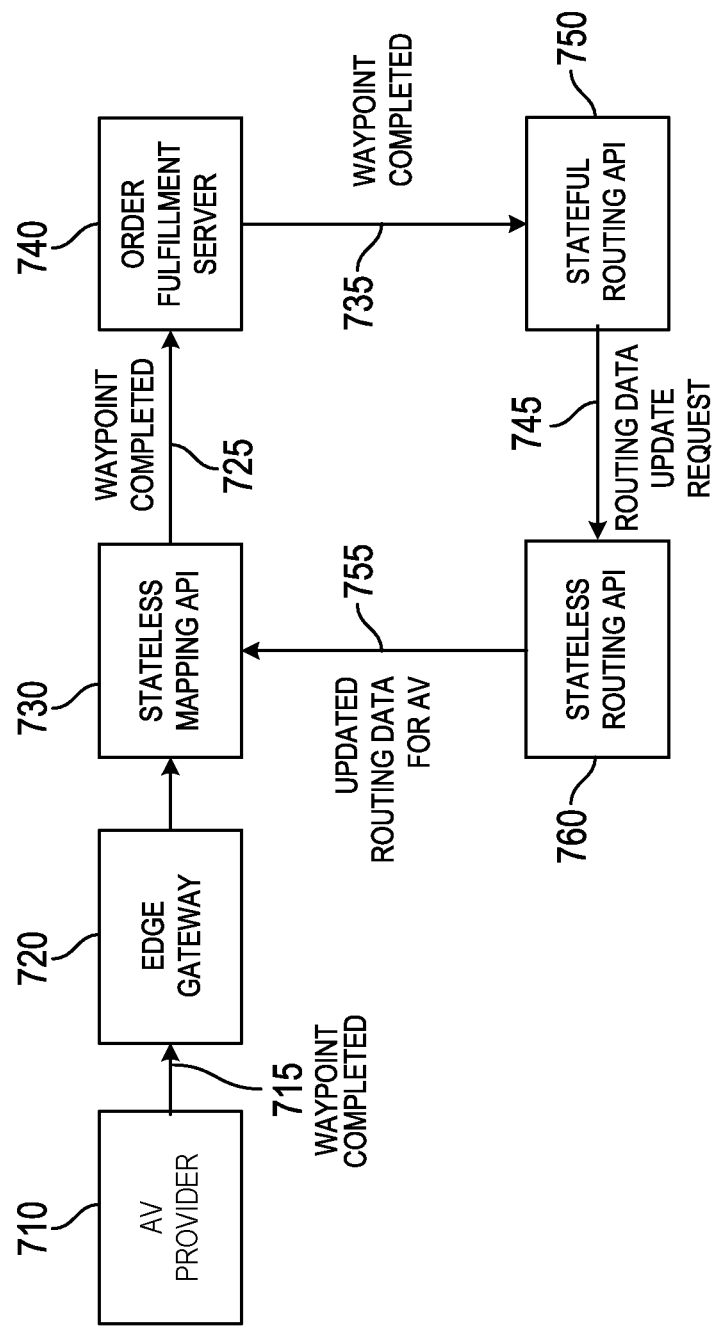
FIG. 7 is a diagram showing an example data flow for waypoint updating.

FIG. 7 is a diagram showing an example data flow for waypoint updating 700. When a route is created for a given origin and destination, the route typically includes a series of waypoints between the origin and destination. As an AV traverses the route, the waypoints may be updated or removed based on the current AV location. In an example, a newly created route may include only two waypoints between the origin and destination, which may correspond to a pickup location and a drop-off location. The waypoint updating 700 may be used to generate one or more additional waypoints, such as between the pickup and drop-off locations.

The waypoint updating 700 may be initiated when an AV provider 710 sends an AV waypoint completion indication 715 through an edge gateway 720 to a stateless mapping API 730. In response to receiving the AV waypoint completion indication 715, the stateless mapping API 730 may send a stateless waypoint completion indication 725 to an order fulfillment server 740. In response to receiving the stateless waypoint completion indication 725, the order fulfillment server 740 may send a fulfillment waypoint completion indication 735 to a stateful routing API 750.

The stateful routing API 750 may be used to initiate the generation of one or more additional waypoints, which may be in response to an API call (e.g., from AV provider 710), in response to receiving the fulfillment waypoint completion indication 735, or in response to an ETA update request. Once the waypoint generation has been initiated at the stateful routing API 750, the stateful routing API 750 may mark the current waypoint as completed and submit a routing data update request 745 to the stateless routing API 760. In response to receiving the routing data update request 745, the stateless routing API 760 may generate and send updated routing data 755 for that AV. The updated routing data 755 includes at least the next waypoint following the recently completed waypoint. The updated routing data 755 may also include one or more additional waypoints between the current AV location and the drop-off location or the route destination.

In some example AV operations, the AV location and waypoint completion may not be synchronized correctly. For example, the AV may be ahead of one or more waypoints within a route, but the stateful routing API 750 may not have yet received the fulfillment waypoint completion indication 735. In this example, the stateful routing API 750 may force a reroute, mark the current waypoint as completed, and call the stateless routing API 760 for a new route and ETA (e.g., to force reroute based on AV location). In another example, the stateful routing API 750 may receive a response from the stateless routing API 760 before the AV has reached the current waypoint, which may occur when the destination is the same as the next waypoint. In this example, the stateful routing API 750 may mark the current waypoint as having been completed, such as to catch up with the stateless routing API 760. In another example, the stateful routing API 750 may receive an indication from the stateless routing API 760 to complete a waypoint that has already been marked as completed. In this example, the stateful routing API 750 may revise the route to remove a current route segment to the completed waypoint and generate a route based on the remaining waypoints. This may be used to remove extraneous responses received from the stateless routing API 760.

Figure 8:
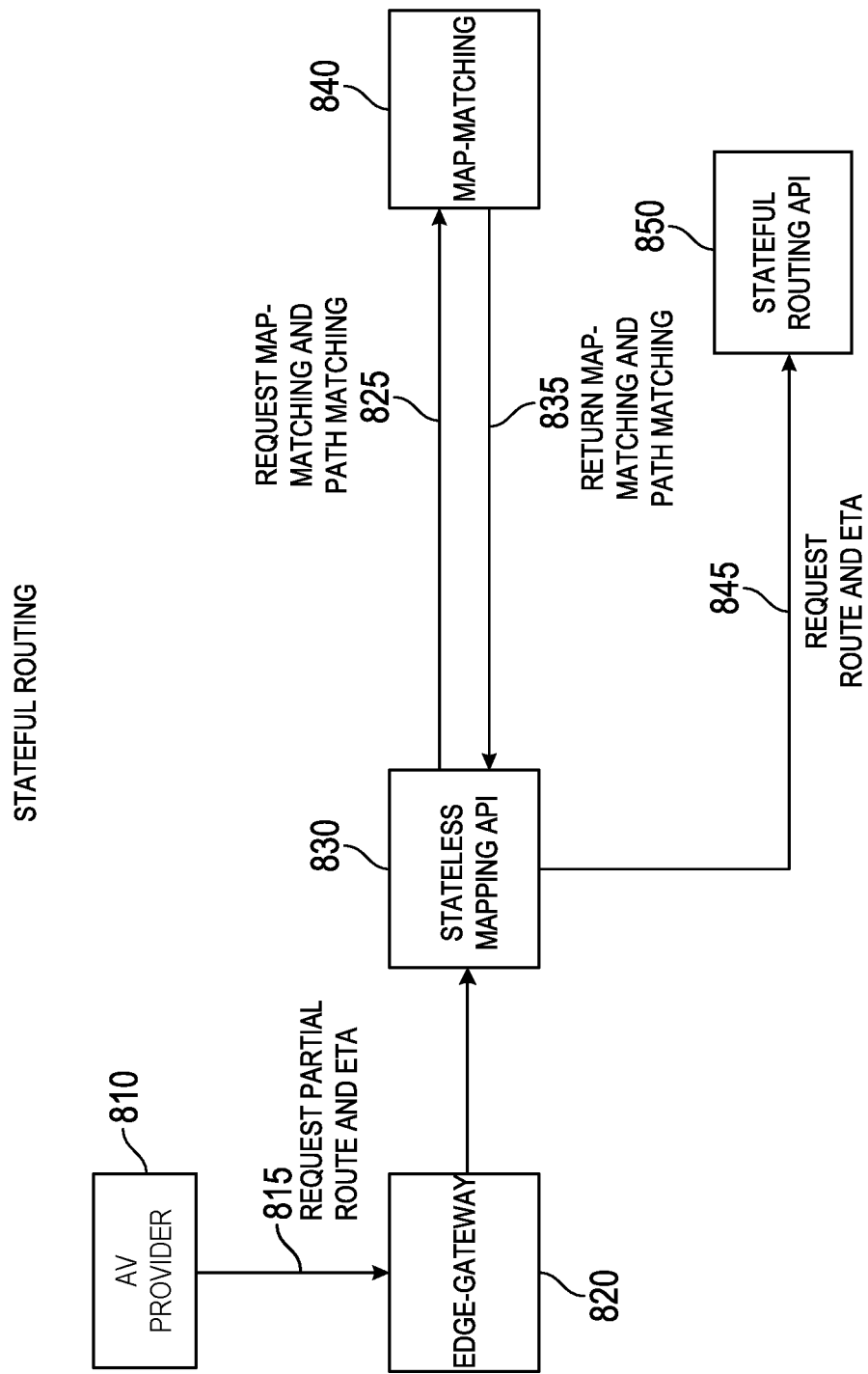
FIG. 8 is a diagram showing an example data flow for stateful routing.

FIG. 8 is a diagram showing an example data flow for stateful routing 800. In contrast with the partial path matching 400 based on an interaction between the stateless mapping API 430 and the map-matching server 440, the stateful routing 800 may be used to generate a route and ETA using the stateful routing API 850.

The stateful routing 800 may begin when an AV provider 810 submits a partial route and ETA 815 through an edge gateway 820 to a stateless mapping API 630. The stateless mapping API 830 sends a request for map-matching and path matching 825 to the map-matching server 840, and the map-matching server 840 may generate and return a map-matched path and ETA 835 to the stateless mapping API 830. Subsequently, the stateful routing API 850 may then request the map-matched route and ETA 845. This may allow an AV or user computing device to request an updated route and ETA using the stateful routing API 850 directly instead of having to submit a request through the stateless mapping API 830.

Figure 9:
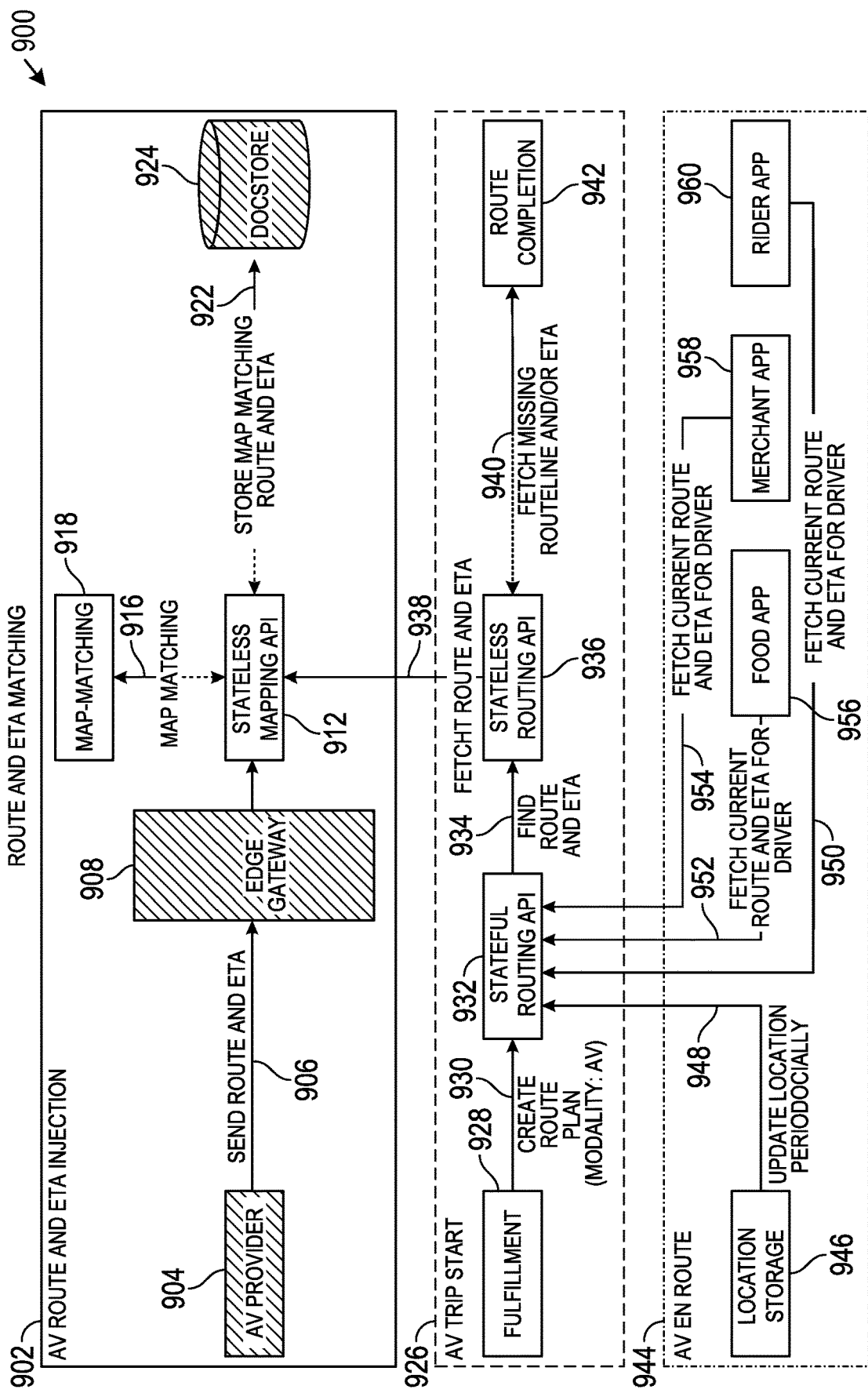
FIG. 9 is a diagram showing an example AV route and ETA matching architecture.

FIG. 9 is a diagram showing an example AV route and ETA matching architecture 900. The ETA matching architecture 900 shows the interactions between three sub-architectures: the AV route and ETA injection 902, an AV trip start 926, and an AV en route 944. The ETA matching architecture 900 includes a combination of some of the features shown or described with respect to the preceding figures. For example, the AV route and ETA injection 902 includes features related to the partial path matching 400 shown in FIG. 4, the AV trip start 926 includes features related to the route and ETA injection 500 shown in FIG. 5, and the AV en route 944 includes features related to the route and ETA updates 600 shown in FIG. 6.

The AV trip start 926 may begin when a user submits an AV request through an order fulfillment server 928. The order fulfillment server 928 then submits a route creation request 930 to a stateful routing API 932, where the route creation request 930 may specify that the route plan is specific to an AV transportation modality. The stateful routing API 932 may be used to store and access the current state of the AV route, the AV progression (e.g., location) along the route, and an ETA based on the AV progression.

In response to receiving the route creation request 930, the stateful routing API 932 may submit a route and ETA request 934 to a stateless routing API 936. In response to receiving the route and ETA request 934, the stateless routing API 936 may submit a route and ETA request 938 to a stateless mapping API 912, and the stateless mapping API 912 may generate and return the route and ETA.

If the returned route or ETA is incomplete, the stateless routing API 936 may forward the incomplete data and submit a route or ETA completion request 940 to a route completion server 942. In response to the route or ETA completion request 940, the route completion server 942 may return a subsequent portion of the route or ETA between the end of the incomplete route and the AV destination. In response to receiving the subsequent portion of the route or ETA, the stateless routing API 936 may stich routes and ETAs (e.g., sum the individual ETA times) into a completed route and ETA.

Once the route and ETA have been received, either in response to the route and ETA request or following combining (e.g., stitching) routes and ETAs, the route and ETA may be returned to the stateful routing API 932. The stateful routing API 932 may store the route and ETA, and may allow the AV or a user to request a current ETA and current state of the AV progression along the route.

The AV en route 944 may be used by an AV that is in the process of following a previously determined route. The AV en route 944 may begin with a location storage server 946 providing a periodic location update 948 to the stateful routing API 932. Using this location information, the stateful routing API 932 may provide the ability for one or more applications running on a user's electronic device to request current location and ETA. This may include a food delivery app 956 fetching the current food delivery route and ETA 952, a merchant delivery app 958 fetching the current merchant delivery route and ETA 954, a rider delivery app 960 (e.g., AV taxi service) fetching the current rider route and ETA 950, or other app requests for AV location and ETA.

The AV en route 944 may also provide the ability for the AV to retrieve an AV location, ETA, or stitched route stored within the stateful routing API 932. In an example, the AV may use this information to improve its navigation, such as by adopting the stitched route in part or in whole. In another example, a routing server or a routing computing device on the AV may receive the stitched route and cause the AV to navigate according to the stitched route. The AV may continue to provide a periodic location update 948, the routing server or AV routing computing device may periodically receive updated stitched routes, and the AV route may continually be controlled by the updated stitched routes until the AV reaches the destination.

The AV route and ETA injection 902 may be used when a partial path and ETA for the partial path are provided by an AV. The ETA injection 902 may begin with an AV provider 904 (e.g., individual AV, AV fleet management service) sending a request 906 for a route and ETA through an edge gateway 908 to a stateless mapping API 912. The request 906 may include sending a partial ETA and partial route. The stateless mapping API 912 may send the partial ETA and route and a map-matching request 916 to a map-matching server 918. The map-matching server 918 may connect the AV partial path to a subsequent portion of the route between the end of the partial path and the AV destination. In an example, the map-matching server 918 may decompose one or more routes between the origin and destination into route segments, match the end of the AV partial path (e.g., AV partial path waypoint) with the beginning of a route segment, generate a second route portion between the beginning of the route segment and the destination, and combine the AV partial path and the second route portion. Following this map-matching, the map-matching server 918 may then return the result to the stateless mapping API 912. The stateless mapping API 912 may then store 922 the map-matched route and ETA to a storage device 924. The route and ETA may be stored and accessed separately, such as to allow separate updating or retrieval of the ETA.

The stateless routing API 936 may fetch the route and ETA request 938 from the stateless mapping API 912. If both the route and ETA are available in storage device 924, the stateless mapping API 912 retrieves and provides the route and ETA from the storage device 924 to the stateful routing API 932. If only the route or ETA is available in storage device 924, the stateless mapping API 912 retrieves the route or ETA, submits a route or ETA completion request 940 to the route completion server 942, submits the completed route and generated ETA to the stateless mapping API 912 for map-matching, then returns the map-matched result to the stateful routing API 932. If neither of the route or ETA are available in storage device 924, the stateless routing API 936 submits a route and ETA completion request 940 to the route completion server 942, then returns the result to the stateful routing API 932.

The map-matching server 918 may provide a full match of the AV route, a partial match to at least a portion of the AV route, or a failure to match the AV route. The full map matching provides the most improvement in accuracy of the route and ETA provided back to a user, though a partial map match also provides improvements to the accuracy of the route and ETA. When the map-matching server 918 provides a partial map-match, the stateless mapping API 912 may anchor the route to the last successfully matched route, then trim the ETA and route to the last known position provided by the periodic location update 948. Additional details regarding map-matching are described further with respect to FIG. 10.

Figure 10:
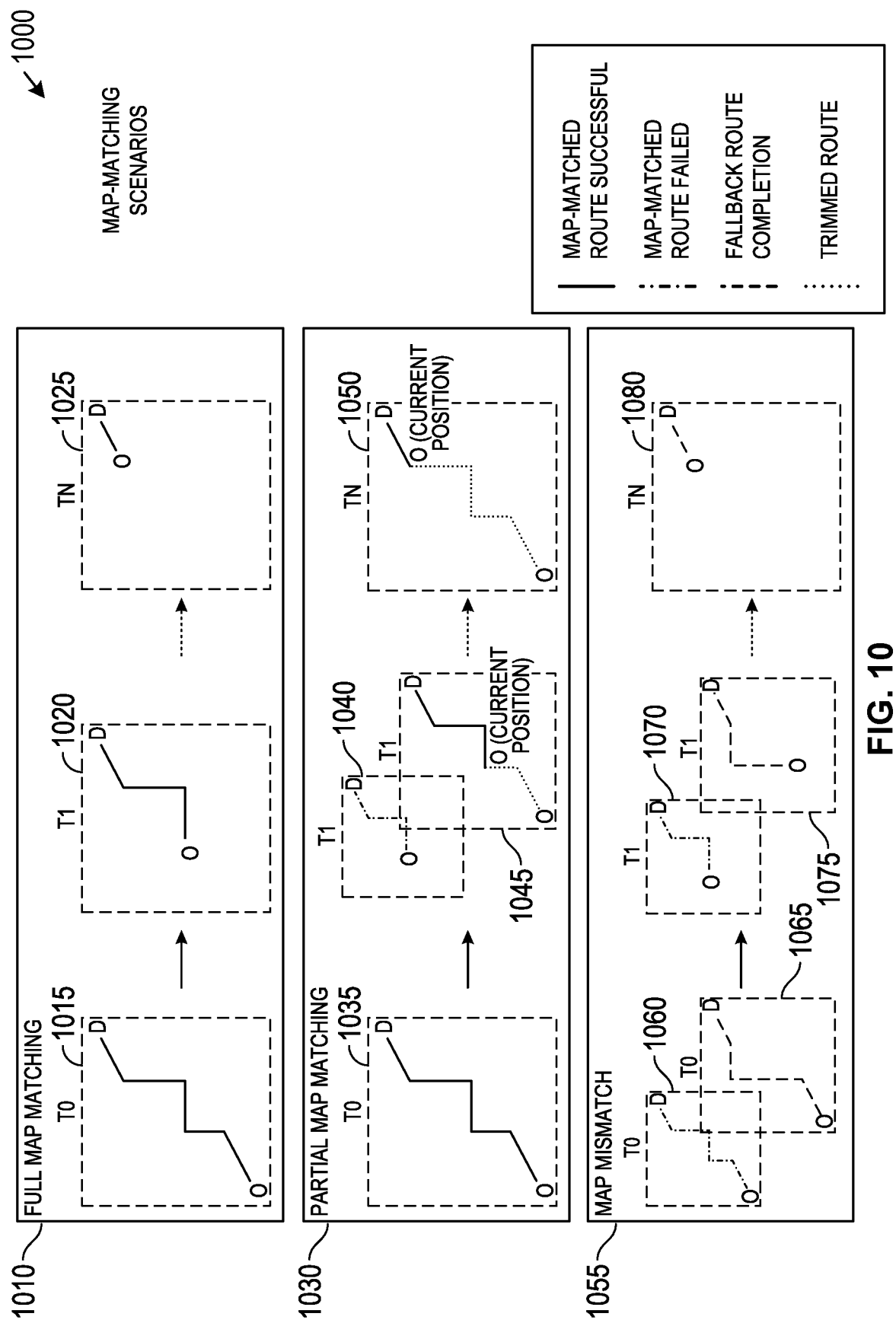
FIG. 10 is a diagram showing example map-matching scenarios.

FIG. 10 is a diagram showing example map-matching scenarios 1000. These map-matching scenarios 1000 include a full map-matching scenario 1010, a partial map-matching scenario 1030, and a map mismatch scenario 1055. The map-matching scenarios 1000 show map-matching for routes as they progress for a given trip from first time T0 to second time T1 through final time TN. While three times are described in the map-matching scenarios 1000, additional times may be used, such as times before T0, times after TN, and other times between T0, T1, and TN.

In the full map-matching scenario 1010, an AV at first time TO 1015 begins with a full route between an origin and destination. At second time T1 1020, the AV has progressed to a new location (e.g., waypoint), and the updated route includes the remainder of the route between a new origin at the AV location and the destination. Similarly, at final time TN 1025, the AV has progressed to another new location, and the final updated route includes the remainder of the route between the newest origin at the AV location and the destination. Throughout the full map-matching scenario 1010, the full route and origin may be fetched by a stateless routing API based on the current AV location along the route. In full map-matching scenario 1010, the map generated by the AV matches the route and ETA fetched by the stateless routing API, and the overlapping routes match when superimposed.

At the first time T0 1035 in full map-matching scenario 1010, an AV at begins with a full route between an origin and destination. However, due to differences in AV routing and navigation, the route taken by the AV may differ from the planned route. In contrast with the matching superimposed routes in the full map-matching scenario 1010, the partial map-matching scenario 1030 at time T1 shows an AV route 1040 diverging from API-provided route 1045. When such a map mismatch occurs, the AV location may be used as an updated origin and the remainder of the originally generated route and ETA may be used to generate estimates for the remaining route and remaining ETA. In the example shown at time TN 1050, the AV route again matches the original route, and the AV location along the remaining route is used to calculate the remaining ETA.

In the map mismatch scenario 1055, at first time T0, the AV route 1060 may not match the API-provided fallback route 1065. As the AV progresses along the route, at second time T1, the updated AV route 1070 may still not match the updated API-provided fallback route 1075. Because the API-provided fallback route 1065 typically provides more accurate routing and ETA estimates, the routing and ETA from the updated API-provided route 1075 may be used to provide estimates of the route and ETA. To show the updated API-provided fallback route 1075, the current AV location may be sent by a stateless routing API to a route completion server, which may return the API-provided fallback route 1075. The route completion server may be used continually to estimate the AV progress along the route and corresponding ETA, such as through the final time TN 1080. Even with the map mismatch scenario 1055, the routing and ETA estimates provide improved accuracy over solutions that use only the AV-provided route and ETA.

Figure 11:
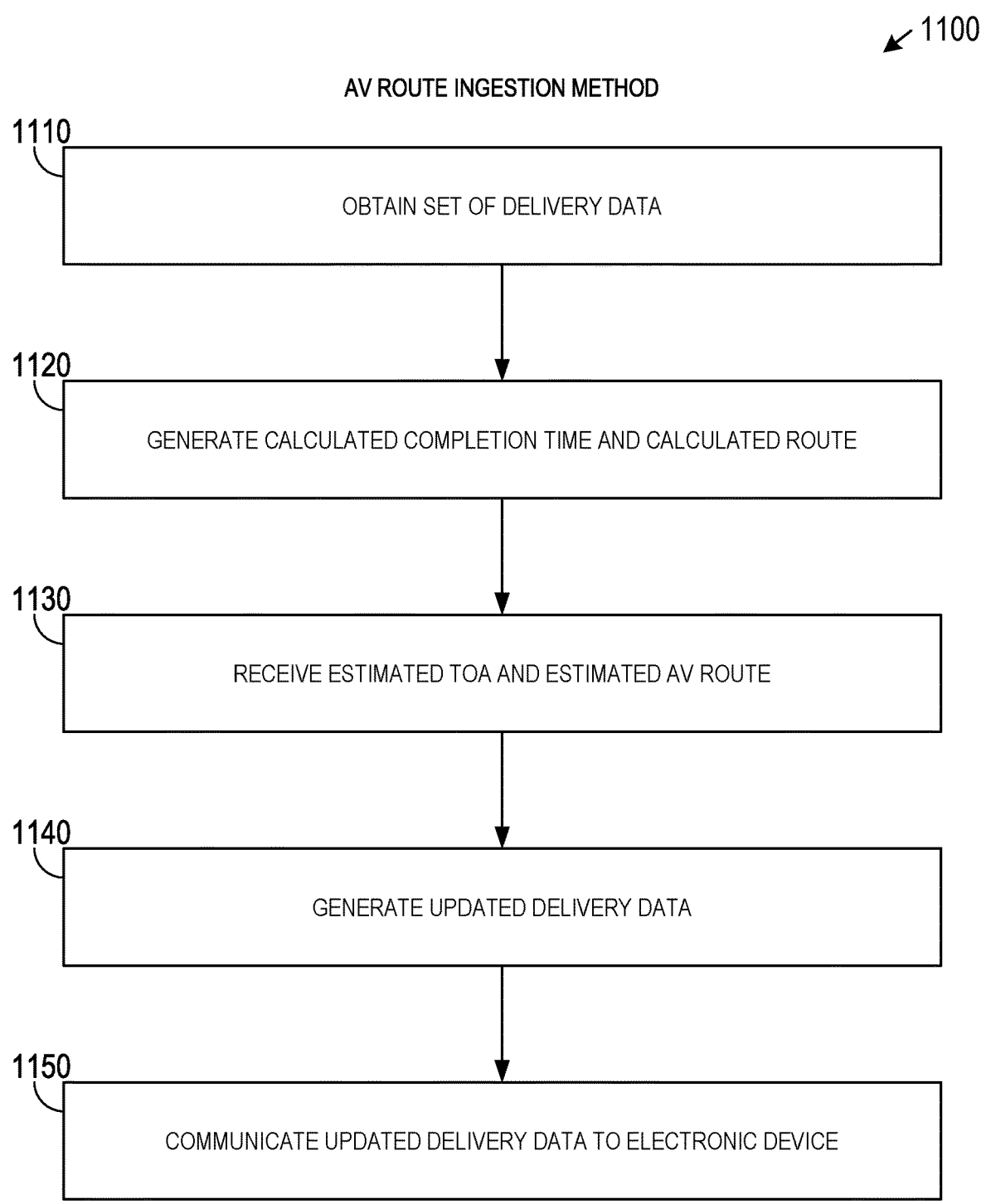
FIG. 11 is a flowchart of an example method for autonomous vehicle route ingestion.

FIG. 11 is a flowchart of an example method 1100 for autonomous vehicle route ingestion. At step 1110, method 1100 includes obtaining, by a first computing system comprising a set of computing devices, a set of delivery data indicative of a delivery request associated with a delivery request user. The set of delivery data may include an item delivery request, a delivery origin location, a delivery destination location, and an indication that the delivery request will be fulfilled by an autonomous vehicle. At step 1120, method 1100 includes generating, at the first computing system, a first calculated completion time and a first calculated route based on the set of delivery data.

At step 1130, method 1100 includes receiving, at the first computing system from a second computing system associated with the autonomous vehicle, a first estimated time of arrival and a first estimated autonomous vehicle route. The first estimated autonomous vehicle route may be different from the first calculated route. At step 1140, method 1100 includes generating, at the first computing system, a first set of updated delivery data including a first corrected trip completion time determined based on the first estimated time of arrival and a first corrected route determined based on the first estimated autonomous vehicle route. At step 1150, method 1100 includes communicating, by the first computing system, the first set of updated delivery data to an electronic device associated with the delivery request user.

The first estimated autonomous vehicle route may include an autonomous vehicle current location and an autonomous navigation waypoint, the autonomous navigation waypoint identifying a location between the autonomous vehicle current location and the delivery destination location. The first estimated time of arrival may include a waypoint time estimate for the autonomous vehicle to navigate from the autonomous vehicle current location to the autonomous navigation waypoint.

Method 1100 may further include generating, at the first computing system, a waypoint route between the autonomous navigation waypoint and the delivery destination location. Method 1100 may further include generating, at the first computing system, a stitched route based on the first estimated autonomous vehicle route and the waypoint route. The first corrected route and the first corrected trip completion time are based on the stitched route.

The first estimated time of arrival at the autonomous navigation waypoint may be generated at the autonomous vehicle based on a set of autonomous navigation sensors at the autonomous vehicle. The first estimated time of arrival may be more accurate than a corresponding time of arrival generated at the first computing system based on the autonomous vehicle current location to the autonomous navigation waypoint.

Method 1100 may further include obtaining, by the first computing system, a set of updated data indicative of an updated state of the delivery request. Method 1100 may further include generating, at the first computing system, a set of updated delivery data including a second corrected trip completion time and a second corrected route based on the updated state of the delivery request. Method 1100 may further include communicating, by the first computing system, the set of updated delivery data to the electronic device associated with the delivery request user.

The set of updated data may include a partial route, where the partial route includes an origin waypoint and a destination waypoint. The set of updated data may include a delivery rerouting indication, an estimated rerouted trip completion time and an estimated rerouted route. The set of updated data may be received in response to an expiration of a periodic timer.

Figure 12:
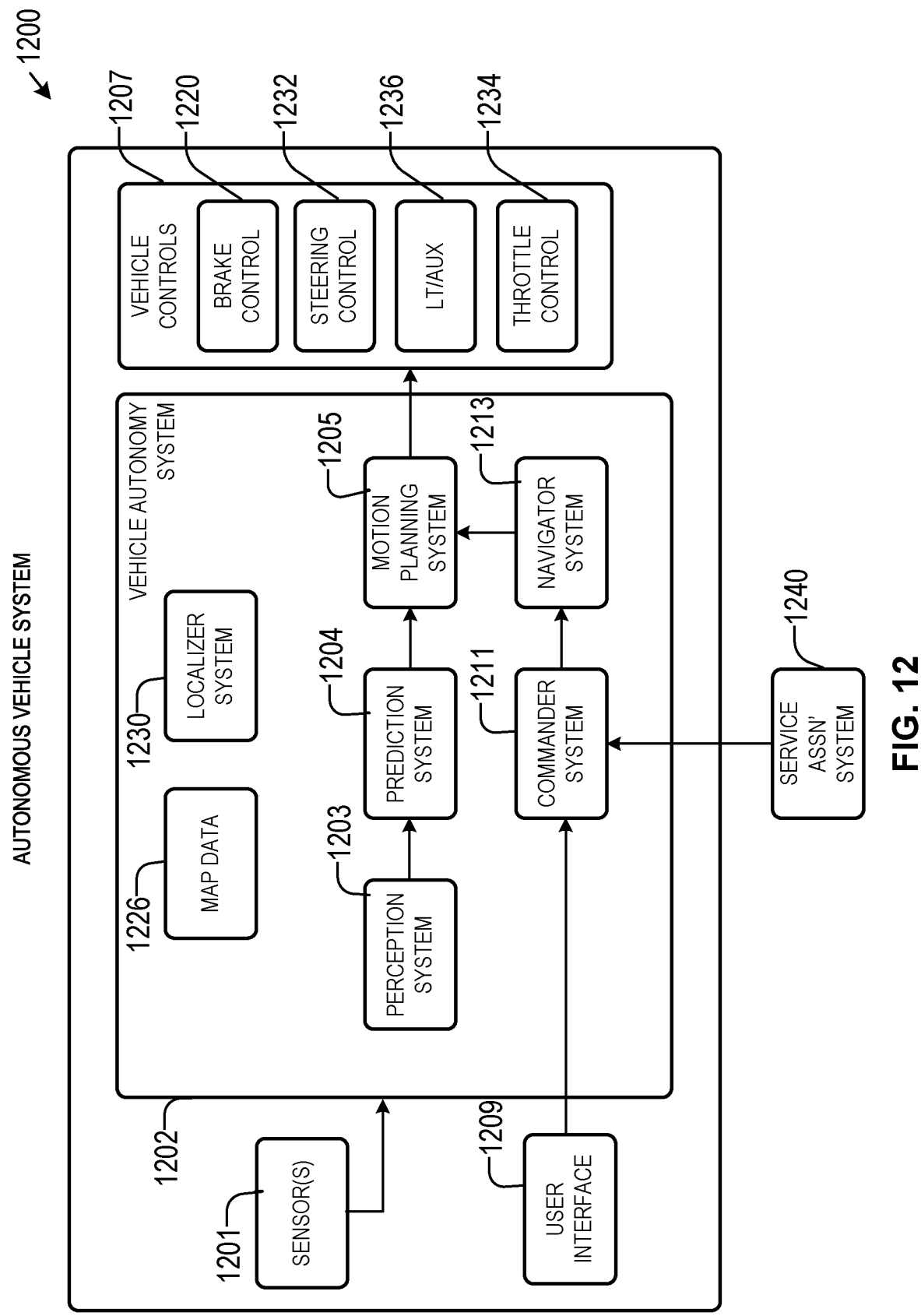
FIG. 12 depicts a block diagram of an example vehicle according to example aspects of the present disclosure.

FIG. 12 depicts a block diagram of an example vehicle 1200 according to example aspects of the present disclosure. The vehicle 1200 shows one example arrangement of the AVs described herein. The vehicle 1200 includes one or more sensors 1201, a vehicle autonomy system 1202, and one or more vehicle controls 1207. The vehicle 1200 is an autonomous vehicle, as described herein. The example vehicle 1200 shows just one example arrangement of an autonomous vehicle. In some examples, autonomous vehicles of different types can have different arrangements.

The vehicle autonomy system 1202 includes a commander system 1211, a navigator system 1213, a perception system 1203, a prediction system 1204, a motion planning system 1205, and a localizer system 1230 that cooperate to perceive the surrounding environment of the vehicle 1200 and determine a motion plan for controlling the motion of the vehicle 1200 accordingly.

The vehicle autonomy system 1202 is engaged to control the vehicle 1200 or to assist in controlling the vehicle 1200. In particular, the vehicle autonomy system 1202 receives sensor data from the one or more sensors 1201, attempts to comprehend the environment surrounding the vehicle 1200 by performing various processing techniques on data collected by the sensors 1201, and generates an appropriate route through the environment. The vehicle autonomy system 1202 sends commands to control the one or more vehicle controls 1207 to operate the vehicle 1200 according to the route.

Various portions of the vehicle autonomy system 1202 receive sensor data from the one or more sensors 1201. For example, the sensors 1201 may include remote-detection sensors as well as motion sensors such as an inertial measurement unit (IMU), one or more encoders, or one or more odometers. The sensor data includes information that describes the location of objects within the surrounding environment of the vehicle 1200, information that describes the motion of the vehicle 1200, etc.

The sensors 1201 may also include one or more remote-detection sensors or sensor systems, such as a LIDAR system, a RADAR system, one or more cameras, etc. As one example, a LIDAR system of the one or more sensors 1201 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensors 1201 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensors 1201 may generate sensor data (e.g., remote-detection sensor data) including still or moving images. Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 1201 can include a positioning system. The positioning system determines a current position of the vehicle 1200. The positioning system can be any device or circuitry for analyzing the position of the vehicle 1200. For example, the positioning system can determine a position by using one or more of inertial sensors, a satellite positioning system such as the Global Positioning System (GPS), a positioning system based on IP address, triangulation and/or proximity to network access points or other network components (e.g., cellular towers, Wi-Fi access points), and/or other suitable techniques. The position of the vehicle 1200 can be used by various systems of the vehicle autonomy system 1202.

Thus, the one or more sensors 1201 are used to collect sensor data that includes information that describes the location (e.g., in three-dimensional space relative to the vehicle 1200) of points that correspond to objects within the surrounding environment of the vehicle 1200. In some implementations, the sensors 1201 can be positioned at different locations on the vehicle 1200. As an example, in some implementations, one or more cameras and/or LIDAR sensors can be located in a pod or other structure that is mounted on a roof of the vehicle 1200, while one or more RADAR sensors can be located in or behind the front and/or rear bumper(s) or body panel(s) of the vehicle 1200. As another example, one or more cameras can be located at the front or rear bumper(s) of the vehicle 1200. Other locations can be used as well.

The localizer system 1230 receives some or all of the sensor data from the sensors 1201 and generates vehicle poses for the vehicle 1200. A vehicle pose describes a position and attitude of the vehicle 1200. The vehicle pose (or portions thereof) can be used by various other components of the vehicle autonomy system 1202 including, for example, the perception system 1203, the prediction system 1204, the motion planning system 1205, and the navigator system 1213.

The position of the vehicle 1200 is a point in a three-dimensional space. In some examples, the position is described by values for a set of Cartesian coordinates, although any other suitable coordinate system may be used. The attitude of the vehicle 1200 generally describes the way in which the vehicle 1200 is oriented at its position. In some examples, attitude is described by a yaw about the vertical axis, a pitch about a first horizontal axis, and a roll about a second horizontal axis. In some examples, the localizer system 1230 generates vehicle poses periodically (e.g., every second, every half second). The localizer system 1230 appends time stamps to vehicle poses, where the time stamp for a pose indicates the point in time that is described by the pose. The localizer system 1230 generates vehicle poses by comparing sensor data (e.g., remote-detection sensor data) to map data 1226 describing the surrounding environment of the vehicle 1200.

In some examples, the localizer system 1230 includes one or more pose estimators and a pose filter. Pose estimators generate pose estimates by comparing remote-detection sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 1230 generates vehicle poses. Accordingly, the pose filter generates some vehicle poses by extrapolating from a previous pose estimate utilizing motion sensor data.

Vehicle poses and/or vehicle positions generated by the localizer system 1230 are provided to various other components of the vehicle autonomy system 1202. For example, the commander system 1211 may use a vehicle position to determine whether to respond to a call from a service assignment system 1240.

The commander system 1211 determines a set of one or more target locations that are used for routing the vehicle 1200. The target locations are determined based on user input received via a user interface 1209 of the vehicle 1200. The user interface 1209 may include and/or use any suitable input/output device or devices. In some examples, the commander system 1211 determines the one or more target locations considering data received from the service assignment system 1240. The service assignment system 1240 is programmed to provide instructions to multiple vehicles, for example, as part of a fleet of vehicles for moving passengers and/or cargo. Data from the service assignment system 1240 can be provided via a wireless network, for example.

The navigator system 1213 receives one or more target locations from the commander system 1211 and map data 1226. The map data 1226, for example, provides detailed information about the surrounding environment of the vehicle 1200. The map data 1226 provides information regarding identity and location of different roadways and roadway elements. A roadway is a place where the vehicle 1200 can drive and may include, for example, a road, a street, a highway, a lane, a parking lot, or a driveway. Routing graph data is a type of map data 1226.

From the one or more target locations and the map data 1226, the navigator system 1213 generates route data describing a route for the vehicle 1200 to take to arrive at the one or more target locations. In some implementations, the navigator system 1213 determines route data using one or more path-planning algorithms based on costs for graph elements/corresponding roadway elements, as described herein. For example, a cost for a route can indicate a time of travel, risk of danger, or other factor associated with adhering to a particular proposed route. Route data describing a route is provided to the motion planning system 1205, which commands the vehicle controls 1207 to implement the route or route extension, as described herein. The navigator system 1213 can generate routes as described herein using a general-purpose routing graph and routing graph modification data. Also, in examples where route data is received from the service assignment system 1240, that route data can also be provided to the motion planning system 1205.

The perception system 1203 detects objects in the surrounding environment of the vehicle 1200 based on sensor 1201 data, the map data 1226, and/or vehicle poses provided by the localizer system 1230. For example, the map data 1226 used by the perception system 1203 describes roadways and segments thereof and may also describe buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 1202 in comprehending and perceiving its surrounding environment and its relationship thereto.

In some examples, the perception system 1203 determines state data for one or more of the objects in the surrounding environment of the vehicle 1200. State data describes a current state of an object (also referred to as features of the object). The state data for each object describes, for example, an estimate of the object's current location (also referred to as position); current speed (also referred to as velocity); current acceleration; current heading; current orientation; size/shape/footprint (e.g., as represented by a bounding shape such as a bounding polygon or polyhedron); type/class (e.g., vehicle, pedestrian, bicycle, or other); yaw rate; distance from the vehicle 1200; minimum path to interaction with the vehicle 1200; minimum time duration to interaction with the vehicle 1200; and/or other state information.

In some implementations, the perception system 1203 determines state data for each object over a number of iterations. In particular, the perception system 1203 updates the state data for each object at each iteration. Thus, the perception system 1203 detects and tracks objects, such as other vehicles, that are proximate to the vehicle 1200 over time.

The prediction system 1204 is configured to predict one or more future positions for an object or objects in the environment surrounding the vehicle 1200 (e.g., an object or objects detected by the perception system 1203). The prediction system 1204 generates prediction data associated with one or more of the objects detected by the perception system 1203. In some examples, the prediction system 1204 generates prediction data describing each of the respective objects detected by the perception system 1203.

Prediction data for an object is indicative of one or more predicted future locations of the object. For example, the prediction system 1204 may predict where the object will be located within the next five seconds, thirty seconds, twenty minutes, etc. Prediction data for an object may indicate a predicted trajectory (e.g., predicted path) for the object within the surrounding environment of the vehicle 1200. For example, the predicted trajectory (e.g., path) can indicate a path along which the respective object is predicted to travel over time (and/or the speed at which the object is predicted to travel along the predicted path). The prediction system 1204 generates prediction data for an object, for example, based on state data generated by the perception system 1203. In some examples, the prediction system 1204 also considers one or more vehicle poses generated by the localizer system 1230 and/or map data 1226.

In some examples, the prediction system 1204 uses state data indicative of an object type or classification to predict a trajectory for the object. As an example, the prediction system 1204 can use state data provided by the perception system 1203 to determine that a particular object (e.g., an object classified as a vehicle) approaching an intersection and maneuvering into a left-turn lane intends to turn left. In such a situation, the prediction system 1204 predicts a trajectory (e.g., path) corresponding to a left turn for the vehicle such that the vehicle turns left at the intersection. Similarly, the prediction system 1204 determines predicted trajectories for other objects, such as bicycles, pedestrians, parked vehicles, etc. The prediction system 1204 provides the predicted trajectories associated with the object(s) to the motion planning system 1205.

In some implementations, the prediction system 1204 is a goal-oriented prediction system 1204 that generates one or more potential goals, selects one or more of the most likely potential goals, and develops one or more trajectories by which the object can achieve the one or more selected goals. For example, the prediction system 1204 can include a scenario generation system that generates and/or scores the one or more goals for an object, and a scenario development system that determines the one or more trajectories by which the object can achieve the goals. In some implementations, the prediction system 1204 can include a machine-learned goal-scoring model, a machine-learned trajectory development model, and/or other machine-learned models.

The motion planning system 1205 commands the vehicle controls 1207 based at least in part on the predicted trajectories associated with the objects within the surrounding environment of the vehicle 1200, the state data for the objects provided by the perception system 1203, vehicle poses provided by the localizer system 1230, the map data 1226, and route or route extension data provided by the navigator system 1213. Stated differently, given information about the current locations of objects and/or predicted trajectories of objects within the surrounding environment of the vehicle 1200, the motion planning system 1205 determines control commands for the vehicle 1200 that best navigate the vehicle 1200 along the route or route extension relative to the objects at such locations and their predicted trajectories on acceptable roadways.

In some implementations, the motion planning system 1205 can also evaluate one or more cost functions and/or one or more reward functions for each of one or more candidate control commands or sets of control commands for the vehicle 1200. Thus, given information about the current locations and/or predicted future locations/trajectories of objects, the motion planning system 1205 can determine a total cost (e.g., a sum of the cost(s) and/or reward(s) provided by the cost function(s) and/or reward function(s)) of adhering to a particular candidate control command or set of control commands. The motion planning system 1205 can select or determine a control command or set of control commands for the vehicle 1200 based at least in part on the cost function(s) and the reward function(s). For example, the motion plan that minimizes the total cost can be selected or otherwise determined.

In some implementations, the motion planning system 1205 can be configured to iteratively update the route or route extension for the vehicle 1200 as new sensor data is obtained from the one or more sensors 1201. For example, as new sensor data is obtained from the one or more sensors 1201, the sensor data can be analyzed by the perception system 1203, the prediction system 1204, and the motion planning system 1205 to determine the motion plan.

The motion planning system 1205 can provide control commands to the one or more vehicle controls 1207. For example, the one or more vehicle controls 1207 can include throttle systems, brake systems, steering systems, and other control systems, each of which can include various vehicle controls (e.g., actuators or other devices that control gas flow, steering, and braking) to control the motion of the vehicle 1200. The various vehicle controls 1207 can include one or more controllers, control devices, motors, and/or processors.

The vehicle controls 1207 include a brake control module 1220. The brake control module 1220 is configured to receive a braking command and bring about a response by applying (or not applying) the vehicle brakes. In some examples, the brake control module 1220 includes a primary system and a secondary system. The primary system receives braking commands and, in response, brakes the vehicle 1200. The secondary system may be configured to determine a failure of the primary system to brake the vehicle 1200 in response to receiving the braking command.

A steering control system 1232 is configured to receive a steering command and bring about a response in the steering mechanism of the vehicle 1200. The steering command is provided to a steering system to provide a steering input to steer the vehicle 1200.

A lighting/auxiliary control module 1236 receives a lighting or auxiliary command. In response, the lighting/auxiliary control module 1236 controls a lighting and/or auxiliary system of the vehicle 1200. Controlling a lighting system may include, for example, turning on, turning off, or otherwise modulating headlights, parking lights, running lights, etc. Controlling an auxiliary system may include, for example, modulating windshield wipers, a defroster, etc.

A throttle control system 1234 is configured to receive a throttle command and bring about a response in the engine speed or other throttle mechanism of the vehicle. For example, the throttle control system 1234 can instruct an engine and/or engine controller, or other propulsion system component, to control the engine or other propulsion system of the vehicle 1200 to accelerate, decelerate, or remain at its current speed.

Each of the perception system 1203, the prediction system 1204, the motion planning system 1205, the commander system 1211, the navigator system 1213, and the localizer system 1230 can be included in or otherwise be a part of the vehicle autonomy system 1202 configured to control the vehicle 1200 based at least in part on data obtained from the one or more sensors 1201. For example, data obtained by the one or more sensors 1201 can be analyzed by each of the perception system 1203, the prediction system 1204, the motion planning system 1205 in a consecutive fashion in order to control the vehicle 1200. While FIG. 12 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 1202 includes one or more computing devices, which may implement all or parts of the perception system 1203, the prediction system 1204, the motion planning system 1205, and/or the localizer system 1230. Descriptions of an example AV routing methods described herein are provided herein with reference to FIG. 11. Descriptions of hardware and software configurations for computing devices to implement the vehicle autonomy system 1202 or the AV routing systems and methods described herein are provided herein with reference to FIG. 13 and FIG. 14.

Figure 13:
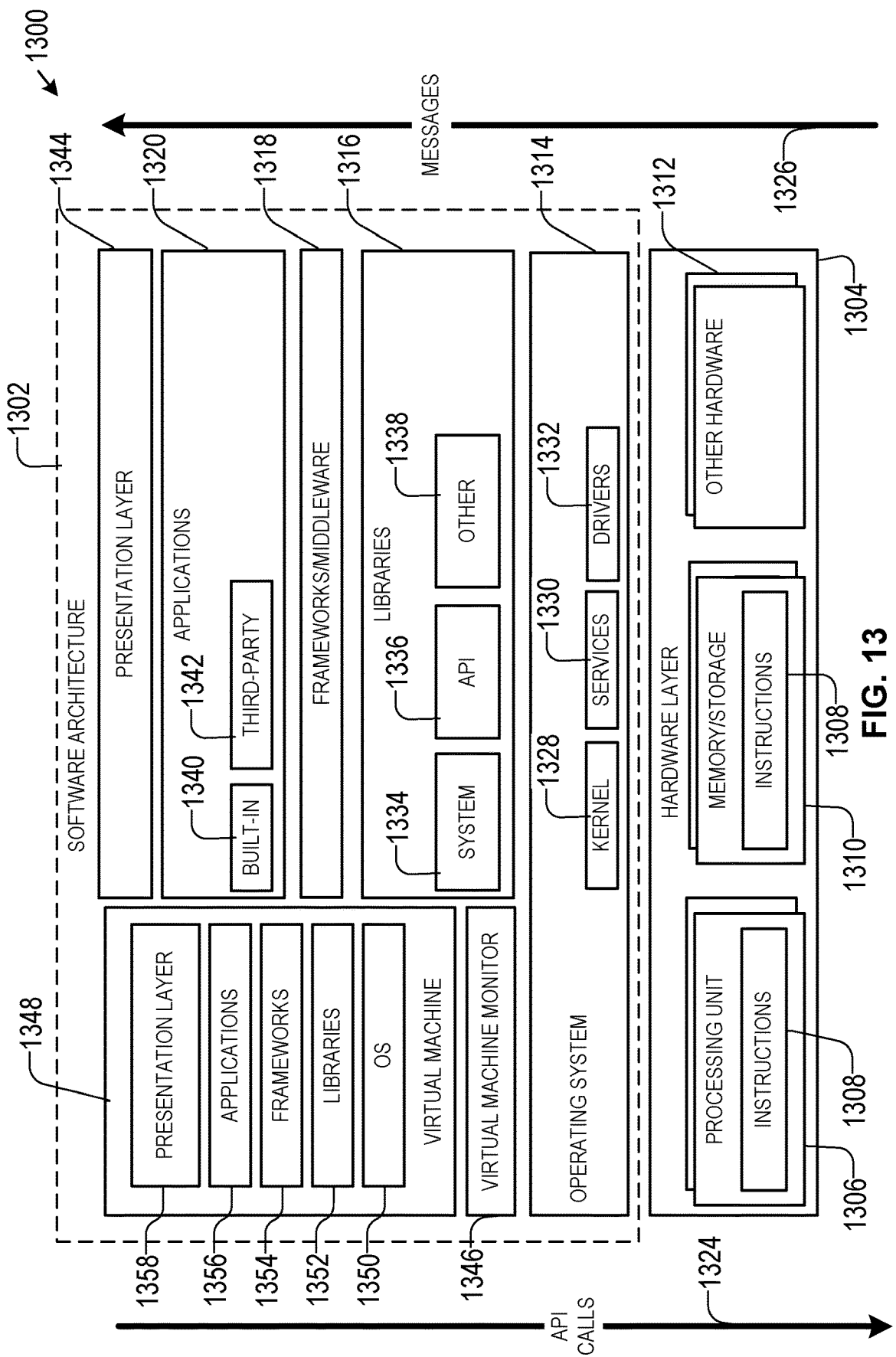
FIG. 13 is a block diagram showing one example of a software architecture for a computing device.

FIG. 13 is a block diagram 1300 showing one example of a software architecture 1302 for a computing device. The software architecture 1302 may be used in conjunction with various hardware architectures, for example, as described herein. FIG. 13 is merely a non-limiting example of a software architecture 1302, and many other architectures may be implemented to facilitate the functionality described herein. A representative hardware layer 1304 is illustrated and can represent, for example, any of the above-referenced computing devices. In some examples, the hardware layer 1304 may be implemented according to a hardware architecture, such as the hardware architecture 1400 of FIG. 14 and/or the software architecture 1302 of FIG. 13.

The representative hardware layer 1304 comprises one or more processing units 1306 having associated executable instructions 1308. The executable instructions 1308 represent the executable instructions of the software architecture 1302, including implementation of the methods, modules, components, and so forth of FIG. 1 through FIG. 11. The hardware layer 1304 also includes memory and/or storage modules 1310, which also have the executable instructions 1308. The hardware layer 1304 may also comprise other hardware 1312, which represents any other hardware of the hardware layer 1304, such as the other hardware illustrated as part of the hardware architecture 1400.

In the example architecture of FIG. 13, the software architecture 1302 may be conceptualized as a stack of layers where each layer provides particular functionality. For example, the software architecture 1302 may include layers such as an operating system 1314, libraries 1316, middleware layer 1318, applications 1320, and a presentation layer 1344. Operationally, the applications 1320 and/or other components within the layers may invoke application programming interface (API) calls 1324 through the software stack and receive a response, returned values, and so forth illustrated as messages 1326 in response to the API calls 1324. The layers illustrated are representative in nature, and not all software architectures have all layers. For example, some mobile or special-purpose operating systems may not provide a middleware layer 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers.

In some examples, the services 1330 include an interrupt service. The interrupt service may detect the receipt of a hardware or software interrupt and, in response, cause the software architecture 1302 to pause its current processing and execute an interrupt service routine (ISR) when an interrupt is received. The ISR may generate an alert.

The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 1316 may provide a common infrastructure that may be used by the applications 1320 and/or other components and/or layers. The libraries 1316 typically provide functionality that allows other software modules to perform tasks in an easier fashion than by interfacing directly with the underlying operating system 1314 functionality (e.g., kernel 1328, services 1330, and/or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media formats such as MPEG4, H.1364, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The middleware layer 1318 (also sometimes referred to as frameworks) may provide a higher-level common infrastructure that may be used by the applications 1320 and/or other software components/modules. For example, the middleware layer 1318 may provide various graphical user interface (GUI) functions, high-level resource management, high-level location services, and so forth. The middleware layer 1318 may provide a broad spectrum of other APIs that may be used by the applications 1320 and/or other software components/modules, some of which may be specific to a particular operating system or platform.

The applications 1320 include built-in applications 1340 and/or third-party applications 1342. Examples of representative built-in applications 1340 may include, but are not limited to, a contacts application, a browser application, a book reader application, a location application, a media application, a messaging application, and/or a game application. The third-party applications 1342 may include any of the built-in applications 1340 as well as a broad assortment of other applications. In a specific example, the third-party application 1342 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1342 may invoke the API calls 1324 provided by the mobile operating system such as the operating system 1314 to facilitate functionality described herein.

The applications 1320 may use built-in operating system functions (e.g., kernel 1328, services 1330, and/or drivers 1332), libraries (e.g., system libraries 1334, API libraries 1336, and other libraries 1338), or middleware layer 1318 to create user interfaces to interact with users of the system. Alternatively, or additionally, in some systems, interactions with a user may occur through a presentation layer, such as the presentation layer 1344. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 13, this is illustrated by a virtual machine 1348. A virtual machine creates a software environment where applications/modules can execute as if they were executing on a hardware computing device. The virtual machine 1348 is hosted by a host operating system (e.g., the operating system 1314) and typically, although not always, has a virtual machine monitor 1346, which manages the operation of the virtual machine 1348 as well as the interface with the host operating system (e.g., the operating system 1314). A software architecture executes within the virtual machine 1348, such as an operating system 1350, libraries 1352, frameworks/middleware 1354, applications 1356, and/or a presentation layer 1358. These layers of software architecture executing within the virtual machine 1348 can be the same as corresponding layers previously described or may be different.

Figure 14:
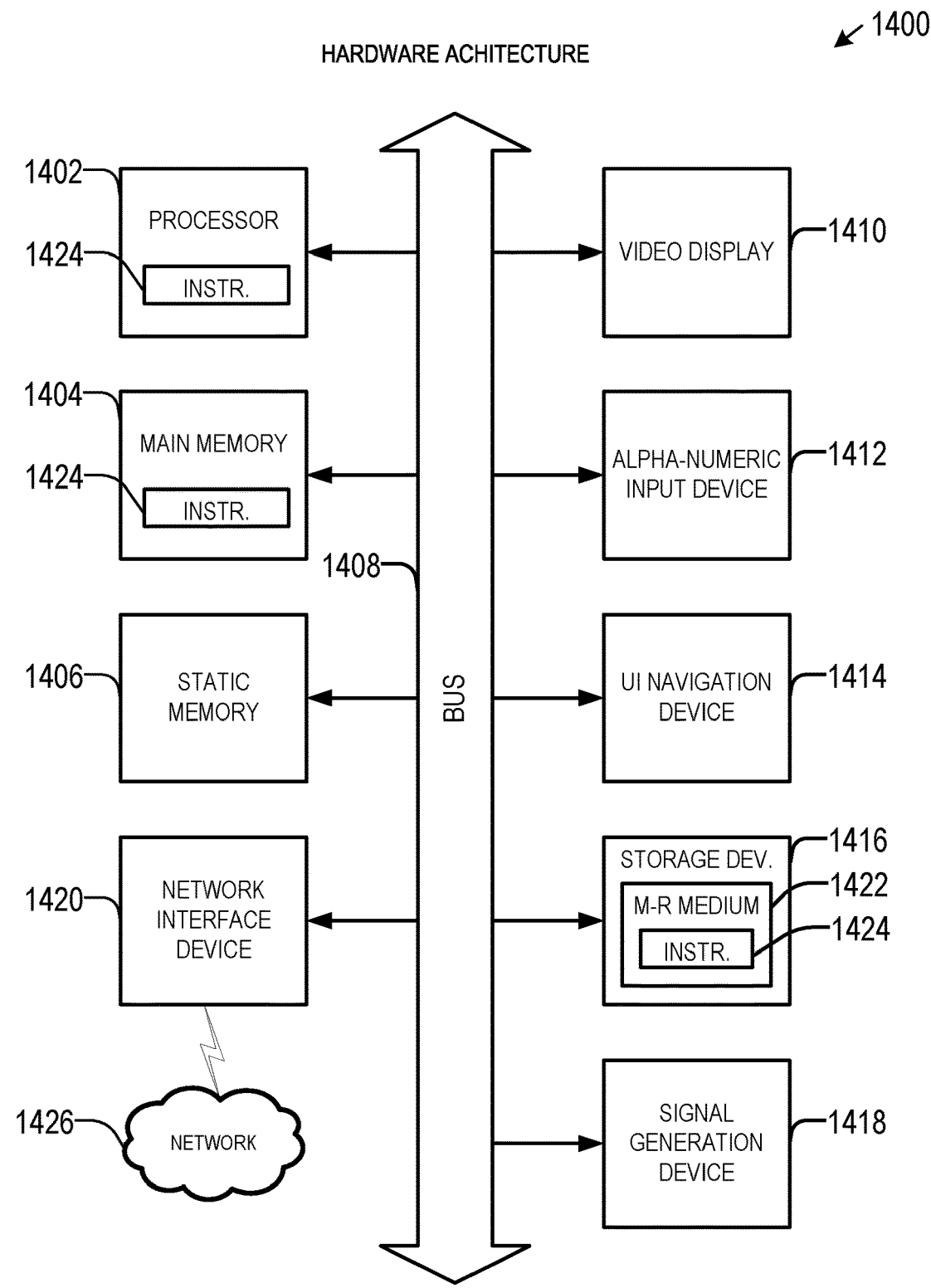
FIG. 14 is a block diagram illustrating a hardware architecture of an example computing device, within which a set or sequence of instructions can be executed to cause a machine to perform examples of any one of the methodologies discussed herein.

FIG. 14 is a block diagram illustrating a hardware architecture 1400 of an example computing device, within which a set or sequence of instructions can be executed to cause a machine to perform examples of any one of the methodologies discussed herein. The hardware architecture 1400 describes a computing device for executing the vehicle autonomy system, described herein.

The hardware architecture 1400 may operate as a stand-alone device or may be connected (e.g., networked) to other machines. In a networked deployment, the hardware architecture 1400 may operate in the capacity of either a server or a client machine in server-client network environments, or it may act as a peer machine in peer-to-peer (or distributed) network environments. The hardware architecture 1400 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example hardware architecture 1400 includes a processor unit 1402 comprising at least one processor (e.g., a central processing unit (CPU), a graphics processing unit (GPU), or both, processor cores, compute nodes). The hardware architecture 1400 may further comprise a main memory 1404 and a static memory 1406, which communicate with each other via a link 1408 (e.g., a bus). The hardware architecture 1400 can further include a video display unit 1410, an input device 1412 (e.g., a keyboard), and a UI navigation device 1414 (e.g., a mouse). In some examples, the video display unit 1410, input device 1412, and UI navigation device 1414 are incorporated into a touchscreen display. The hardware architecture 1400 may additionally include a storage device 1416 (e.g., a drive unit), a signal generation device 1418 (e.g., a speaker), a network interface device 1420, and one or more sensors (not shown), such as a Global Positioning System (GPS) sensor, compass, accelerometer, or other sensor.

In some examples, the processor unit 1402 or another suitable hardware component may support a hardware interrupt. In response to a hardware interrupt, the processor unit 1402 may pause its processing and execute an ISR, for example, as described herein.

The storage device 1416 includes a machine-readable medium 1422 on which is stored one or more sets of data structures and instructions 1424 (e.g., software) embodying or used by any one or more of the methodologies or functions described herein. The instructions 1424 can also reside, completely or at least partially, within the main memory 1404, within the static memory 1406, and/or within the processor unit 1402 during execution thereof by the hardware architecture 1400, with the main memory 1404, the static memory 1406, and the processor unit 1402 also constituting machine-readable media.

The various memories (i.e., main memory 1404, static memory 1406, and/or memory of the processor unit(s) 1402) and/or the storage device 1416 may store one or more sets of instructions and data structures (e.g., the instructions 1424) embodying or used by any one or more of the methodologies or functions described herein. These instructions, when executed by the processor unit(s) 1402, cause various operations to implement the disclosed examples.

As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium" and "device-readable medium" mean the same thing and may be used interchangeably in this disclosure. The terms are defined to include both non-transitory machine-storage media and signal media. Thus, the terms include both storage devices/media and carrier waves/modulated data signals.

The instructions 1424 can further be transmitted or received over a communications network 1426 using a transmission medium via the network interface device 1420 using any one of a number of well-known transfer protocols (e.g., Hypertext Transfer Protocol (HTTP)). Examples of communication networks include a local area network (LAN), a wide area network (WAN), the Internet, mobile telephone networks, plain old telephone service (POTS) networks, and wireless data networks (e.g., Wi-Fi, 3G, 4G Long-Term Evolution (LTE)/LTE-A, 5G, or WiMAX networks).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

Below are examples of the subject matter described herein:

Example 1 is a system for autonomous vehicle route ingestion, the system comprising: at least one processor; and at least one machine-readable medium comprising instructions thereon that, when executed by the at least one processor, causes the at least one processor to perform operations comprising: obtaining, by a first computing system comprising a set of computing devices, a set of delivery data indicative of a delivery request associated with a delivery request user, the set of delivery data including an item delivery request, a delivery origin location, a delivery destination location, and an indication that the delivery request will be fulfilled by an autonomous vehicle; generating, at the first computing system, a first calculated completion time and a first calculated route based on the set of delivery data; receiving, at the first computing system from a second computing system associated with the autonomous vehicle, a first estimated time of arrival and a first estimated autonomous vehicle route, the first estimated autonomous vehicle route different from the first calculated route; generating, at the first computing system, a first set of updated delivery data including a first corrected trip completion time determined based on the first estimated time of arrival and a first corrected route determined based on the first estimated autonomous vehicle route; and communicating, by the first computing system, the first set of updated delivery data to an electronic device associated with the delivery request user.

In Example 2, the subject matter of Example 1 includes wherein: the first estimated autonomous vehicle route includes an autonomous vehicle current location and an autonomous navigation waypoint, the autonomous navigation waypoint identifying a location between the autonomous vehicle current location and the delivery destination location; and the first estimated time of arrival includes a waypoint time estimate for the autonomous vehicle to navigate from the autonomous vehicle current location to the autonomous navigation waypoint.

In Example 3, the subject matter of Example 2 includes the operations further including: generating, at the first computing system, a waypoint route between the autonomous navigation waypoint and the delivery destination location; and generating, at the first computing system, a composite route based on the first estimated autonomous vehicle route and the waypoint route; wherein the first corrected route and the first corrected trip completion time are based on the composite route.

In Example 4, the subject matter of Examples 2-3 includes wherein: the first estimated time of arrival at the autonomous navigation waypoint is generated at the autonomous vehicle based on a set of autonomous navigation sensors at the autonomous vehicle; and the first estimated time of arrival is more accurate than a corresponding time of arrival generated at the first computing system based on the autonomous vehicle current location to the autonomous navigation waypoint.

In Example 5, the subject matter of Examples 1-4 includes the operations further including sending navigation instructions to the autonomous vehicle, the navigation instructions causing the autonomous vehicle to navigate based on the first estimated autonomous vehicle route.

In Example 6, the subject matter of Examples 1-5 includes the operations further including: obtaining, by the first computing system, a set of updated data indicative of an updated state of the delivery request; generating, at the first computing system, a set of updated delivery data including a second corrected trip completion time and a second corrected route based on the updated state of the delivery request; and communicating, by the first computing system, the set of updated delivery data to the electronic device associated with the delivery request user.

In Example 7, the subject matter of Example 6 includes wherein the set of updated data includes a partial route, the partial route including an origin waypoint and a destination waypoint.

In Example 8, the subject matter of Examples 6-7 includes wherein the set of updated data includes a delivery rerouting indication, an estimated rerouted trip completion time and an estimated rerouted route.

In Example 9, the subject matter of Examples 6-8 includes wherein the set of updated data is received in response to an expiration of a periodic timer.

Example 10 is a method for autonomous vehicle route ingestion, the method comprising: obtaining, by a first computing system comprising a set of computing devices, a set of delivery data indicative of a delivery request associated with a delivery request user, the set of delivery data including an item delivery request, a delivery origin location, a delivery destination location, and an indication that the delivery request will be fulfilled by an autonomous vehicle; generating, at the first computing system, a first calculated completion time and a first calculated route based on the set of delivery data; receiving, at the first computing system from a second computing system associated with the autonomous vehicle, a first estimated time of arrival and a first estimated autonomous vehicle route, the first estimated autonomous vehicle route different from the first calculated route; generating, at the first computing system, a first set of updated delivery data including a first corrected trip completion time determined based on the first estimated time of arrival and a first corrected route determined based on the first estimated autonomous vehicle route; and communicating, by the first computing system, the first set of updated delivery data to an electronic device associated with the delivery request user.

In Example 11, the subject matter of Example 10 includes wherein: the first estimated autonomous vehicle route includes an autonomous vehicle current location and an autonomous navigation waypoint, the autonomous navigation waypoint identifying a location between the autonomous vehicle current location and the delivery destination location; and the first estimated time of arrival includes a waypoint time estimate for the autonomous vehicle to navigate from the autonomous vehicle current location to the autonomous navigation waypoint.

In Example 12, the subject matter of Example 11 includes generating, at the first computing system, a waypoint route between the autonomous navigation waypoint and the delivery destination location; and generating, at the first computing system, a composite route based on the first estimated autonomous vehicle route and the waypoint route; wherein the first corrected route and the first corrected trip completion time are based on the composite route.

In Example 13, the subject matter of Examples 11-12 includes wherein: the first estimated time of arrival at the autonomous navigation waypoint is generated at the autonomous vehicle based on a set of autonomous navigation sensors at the autonomous vehicle; and the first estimated time of arrival is more accurate than a corresponding time of arrival generated at the first computing system based on the autonomous vehicle current location to the autonomous navigation waypoint.

In Example 14, the subject matter of Examples 10-13 includes sending navigation instructions to the autonomous vehicle, the navigation instructions causing the autonomous vehicle to navigate based on the first estimated autonomous vehicle route.

In Example 15, the subject matter of Examples 10-14 includes obtaining, by the first computing system, a set of updated data indicative of an updated state of the delivery request; generating, at the first computing system, a set of updated delivery data including a second corrected trip completion time and a second corrected route based on the updated state of the delivery request; and communicating, by the first computing system, the set of updated delivery data to the electronic device associated with the delivery request user.

In Example 16, the subject matter of Example 15 includes wherein the set of updated data includes a partial route, the partial route including an origin waypoint and a destination waypoint.

In Example 17, the subject matter of Examples 15-16 includes wherein the set of updated data includes a delivery rerouting indication, an estimated rerouted trip completion time and an estimated rerouted route.

In Example 18, the subject matter of Examples 15-17 includes wherein the set of updated data is received in response to an expiration of a periodic timer.

Example 19 is a non-transitory machine-readable medium comprising instructions thereon that, when executed by at least one processor, causes the at least one processor to perform operations comprising: obtaining, by a first computing system comprising a set of computing devices, a set of delivery data indicative of a delivery request associated with a delivery request user, the set of delivery data including an item delivery request, a delivery origin location, a delivery destination location, and an indication that the delivery request will be fulfilled by an autonomous vehicle; generating, at the first computing system, a first calculated completion time and a first calculated route based on the set of delivery data; receiving, at the first computing system from a second computing system associated with the autonomous vehicle, a first estimated time of arrival and a first estimated autonomous vehicle route, the first estimated autonomous vehicle route different from the first calculated route; generating, at the first computing system, a first set of updated delivery data including a first corrected trip completion time determined based on the first estimated time of arrival and a first corrected route determined based on the first estimated autonomous vehicle route; and communicating, by the first computing system, the first set of updated delivery data to an electronic device associated with the delivery request user.

In Example 20, the subject matter of Example 19 includes wherein: the first estimated autonomous vehicle route includes an autonomous vehicle current location and an autonomous navigation waypoint, the autonomous navigation waypoint identifying a location between the autonomous vehicle current location and the delivery destination location; and the first estimated time of arrival includes a waypoint time estimate for the autonomous vehicle to navigate from the autonomous vehicle current location to the autonomous navigation waypoint.

In Example 21, the subject matter of Example 20 includes the operations further including: generating, at the first computing system, a waypoint route between the autonomous navigation waypoint and the delivery destination location; and generating, at the first computing system, a composite route based on the first estimated autonomous vehicle route and the waypoint route; wherein the first corrected route and the first corrected trip completion time are based on the composite route.

In Example 22, the subject matter of Examples 20-21 includes wherein: the first estimated time of arrival at the autonomous navigation waypoint is generated at the autonomous vehicle based on a set of autonomous navigation sensors at the autonomous vehicle; and the first estimated time of arrival is more accurate than a corresponding time of arrival generated at the first computing system based on the autonomous vehicle current location to the autonomous navigation waypoint.

In Example 23, the subject matter of Examples 19-22 includes the operations further including sending navigation instructions to the autonomous vehicle, the navigation instructions causing the autonomous vehicle to navigate based on the first estimated autonomous vehicle route.

In Example 24, the subject matter of Examples 19-23 includes the operations further including: obtaining, by the first computing system, a set of updated data indicative of an updated state of the delivery request; generating, at the first computing system, a set of updated delivery data including a second corrected trip completion time and a second corrected route based on the updated state of the delivery request; and communicating, by the first computing system, the set of updated delivery data to the electronic device associated with the delivery request user.

In Example 25, the subject matter of Example 24 includes wherein the set of updated data includes a partial route, the partial route including an origin waypoint and a destination waypoint.

In Example 26, the subject matter of Examples 24-25 includes wherein the set of updated data includes a delivery rerouting indication, an estimated rerouted trip completion time and an estimated rerouted route.

In Example 27, the subject matter of Examples 24-26 includes wherein the set of updated data is received in response to an expiration of a periodic timer.

Example 28 is at least one machine-readable medium including instructions that, when executed by processing circuitry, cause the processing circuitry to perform operations to implement of any of Examples 1-27.

Example 29 is an apparatus comprising means to implement of any of Examples 1-27.

Example 30 is a system to implement of any of Examples 1-27.

Example 31 is a method to implement of any of Examples 1-27.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

What is claimed is:

1. A system for autonomous vehicle route ingestion, the system comprising:
    at least one processor; and
    at least one machine-readable medium comprising instructions thereon that, when executed by the at least one processor, causes the at least one processor to perform operations comprising:
    obtaining, by a first computing system comprising a set of computing devices, a set of delivery data indicative of a delivery request associated with a delivery request user, the set of delivery data including an item delivery request, a delivery origin location, a delivery destination location, and an indication that the delivery request will be fulfilled by an autonomous vehicle;
    generating, at the first computing system, a first calculated completion time and a first calculated route based on the set of delivery data;
    receiving, at the first computing system from a second computing system associated with the autonomous vehicle, a first estimated time of arrival and a first estimated autonomous vehicle route, the first estimated autonomous vehicle route different from the first calculated route;
    generating, at the first computing system, a first set of updated delivery data including a first corrected trip completion time determined based on the first estimated time of arrival and a first corrected route determined based on the first estimated autonomous vehicle route; and
    communicating, by the first computing system, the first set of updated delivery data to an electronic device associated with the delivery request user.

2. The system of claim 1, wherein:
    the first estimated autonomous vehicle route includes an autonomous vehicle current location and an autonomous navigation waypoint, the autonomous navigation waypoint identifying a location between the autonomous vehicle current location and the delivery destination location; and
    the first estimated time of arrival includes a waypoint time estimate for the autonomous vehicle to navigate from the autonomous vehicle current location to the autonomous navigation waypoint.

3. The system of claim 2, the operations further including:
    generating, at the first computing system, a waypoint route between the autonomous navigation waypoint and the delivery destination location; and
    generating, at the first computing system, a composite route based on the first estimated autonomous vehicle route and the waypoint route;
    wherein the first corrected route and the first corrected trip completion time are based on the composite route.

4. The system of claim 2, wherein:
    the first estimated time of arrival at the autonomous navigation waypoint is generated at the autonomous vehicle based on a set of autonomous navigation sensors at the autonomous vehicle; and
    the first estimated time of arrival is more accurate than a corresponding time of arrival generated at the first computing system based on the autonomous vehicle current location to the autonomous navigation waypoint.

5. The system of claim 1, the operations further including sending navigation instructions to the autonomous vehicle, the navigation instructions causing the autonomous vehicle to navigate based on the first estimated autonomous vehicle route.

6. The system of claim 1, the operations further including:
    obtaining, by the first computing system, a set of updated data indicative of an updated state of the delivery request;
    generating, at the first computing system, a set of updated delivery data including a second corrected trip completion time and a second corrected route based on the updated state of the delivery request; and
    communicating, by the first computing system, the set of updated delivery data to the electronic device associated with the delivery request user.

7. The system of claim 6, wherein the set of updated data includes a partial route, the partial route including an origin waypoint and a destination waypoint.

8. The system of claim 6, wherein the set of updated data includes a delivery rerouting indication, an estimated rerouted trip completion time and an estimated rerouted route.

9. The system of claim 6, wherein the set of updated data is received in response to an expiration of a periodic timer.

10. A method for autonomous vehicle route ingestion, the method comprising:
    obtaining, by a first computing system comprising a set of computing devices, a set of delivery data indicative of a delivery request associated with a delivery request user, the set of delivery data including an item delivery request, a delivery origin location, a delivery destination location, and an indication that the delivery request will be fulfilled by an autonomous vehicle;

generating, at the first computing system, a first calculated completion time and a first calculated route based on the set of delivery data;

receiving, at the first computing system from a second computing system associated with the autonomous vehicle, a first estimated time of arrival and a first estimated autonomous vehicle route, the first estimated autonomous vehicle route different from the first calculated route;

generating, at the first computing system, a first set of updated delivery data including a first corrected trip completion time determined based on the first estimated time of arrival and a first corrected route determined based on the first estimated autonomous vehicle route; and communicating, by the first computing system, the first set of updated delivery data to an electronic device associated with the delivery request user.

11. The method of claim 10, wherein:

the first estimated autonomous vehicle route includes an autonomous vehicle current location and an autonomous navigation waypoint, the autonomous navigation waypoint identifying a location between the autonomous vehicle current location and the delivery destination location; and the first estimated time of arrival includes a waypoint time estimate for the autonomous vehicle to navigate from the autonomous vehicle current location to the autonomous navigation waypoint.

12. The method of claim 11, further including:

generating, at the first computing system, a waypoint route between the autonomous navigation waypoint and the delivery destination location; and generating, at the first computing system, a composite route based on the first estimated autonomous vehicle route and the waypoint route;

wherein the first corrected route and the first corrected trip completion time are based on the composite route.

13. The method of claim 11, wherein:

the first estimated time of arrival at the autonomous navigation waypoint is generated at the autonomous vehicle based on a set of autonomous navigation sensors at the autonomous vehicle; and the first estimated time of arrival is more accurate than a corresponding time of arrival generated at the first computing system based on the autonomous vehicle current location to the autonomous navigation waypoint.

14. The method of claim 10, further including sending navigation instructions to the autonomous vehicle, the navigation instructions causing the autonomous vehicle to navigate based on the first estimated autonomous vehicle route.

15. The method of claim 10, further including:

obtaining, by the first computing system, a set of updated data indicative of an updated state of the delivery request;

generating, at the first computing system, a set of updated delivery data including a second corrected trip completion time and a second corrected route based on the updated state of the delivery request; and communicating, by the first computing system, the set of updated delivery data to the electronic device associated with the delivery request user.

16. A non-transitory machine-readable medium comprising instructions thereon that, when executed by at least one processor, causes the at least one processor to perform operations comprising:

obtaining, by a first computing system comprising a set of computing devices, a set of delivery data indicative of a delivery request associated with a delivery request user, the set of delivery data including an item delivery request, a delivery origin location, a delivery destination location, and an indication that the delivery request will be fulfilled by an autonomous vehicle;

generating, at the first computing system, a first calculated completion time and a first calculated route based on the set of delivery data;

receiving, at the first computing system from a second computing system associated with the autonomous vehicle, a first estimated time of arrival and a first estimated autonomous vehicle route, the first estimated autonomous vehicle route different from the first calculated route;

generating, at the first computing system, a first set of updated delivery data including a first corrected trip completion time determined based on the first estimated time of arrival and a first corrected route determined based on the first estimated autonomous vehicle route; and communicating, by the first computing system, the first set of updated delivery data to an electronic device associated with the delivery request user.

17. The non-transitory machine-readable medium of claim 16, wherein:

the first estimated autonomous vehicle route includes an autonomous vehicle current location and an autonomous navigation waypoint, the autonomous navigation waypoint identifying a location between the autonomous vehicle current location and the delivery destination location; and the first estimated time of arrival includes a waypoint time estimate for the autonomous vehicle to navigate from the autonomous vehicle current location to the autonomous navigation waypoint.

18. The non-transitory machine-readable medium of claim 17, the operations further including:

generating, at the first computing system, a waypoint route between the autonomous navigation waypoint and the delivery destination location; and generating, at the first computing system, a composite route based on the first estimated autonomous vehicle route and the waypoint route;

wherein the first corrected route and the first corrected trip completion time are based on the composite route.

19. The non-transitory machine-readable medium of claim 17, wherein:

the first estimated time of arrival at the autonomous navigation waypoint is generated at the autonomous vehicle based on a set of autonomous navigation sensors at the autonomous vehicle; and the first estimated time of arrival is more accurate than a corresponding time of arrival generated at the first computing system based on the autonomous vehicle current location to the autonomous navigation waypoint.

20. The non-transitory machine-readable medium of claim 16, the operations further including sending navigation instructions to the autonomous vehicle, the navigation instructions causing the autonomous vehicle to navigate based on the first estimated autonomous vehicle route.

* * * * *